(12) United States Patent  
Tang et al.

(10) Patent No.: US 8,878,975 B2
(45) Date of Patent: Nov. 4, 2014

(54) IMAGE OPTICAL LENS SYSTEM

(75) Inventors: Hsiang-Chi Tang, Taichung (TW);
Tsung-Han Tsai, Taichung (TW);
Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 326 days.

(21) Appl. No.: 13/594,867

(22) Filed: Aug. 26, 2012

(65) Prior Publication Data
US 2013/0141633 A1 Jun. 6, 2013

(30) Foreign Application Priority Data

Dec. 1, 2011 (TW) .............................. 100144226 A

(51) Int. Cl.
*H04N 5/225* (2006.01)
*G02B 13/16* (2006.01)
*G02B 9/34* (2006.01)

(52) U.S. Cl.
USPC ......................................... 348/335; 359/773

(58) Field of Classification Search
USPC ........... 348/335, 340; 359/363, 432, 676, 773
See application file for complete search history.

(56) References Cited

U.S. PATENT DOCUMENTS

| | | | |
|---|---|---|---|
| 7,911,697 B2 * | 3/2011 | Ohtake et al. | ................. 359/557 |
| 7,957,075 B2 | 6/2011 | Tang | |
| 7,957,079 B2 | 6/2011 | Tang | |
| 7,961,406 B2 | 6/2011 | Tang et al. | |
| 2011/0249171 A1* | 10/2011 | Shigemitsu et al. | .......... 348/340 |
| 2012/0019705 A1* | 1/2012 | Sano et al. | .................... 348/340 |

* cited by examiner

*Primary Examiner* — Nicholas Giles
(74) *Attorney, Agent, or Firm* — CKC & Partners Co., Ltd.

(57) ABSTRACT

An image optical lens system includes, in order from an object side to an image side, a first lens element, a second lens element, a third lens element and a fourth lens element. The first lens element with positive refractive power has a convex object-side surface. The second lens element has negative refractive power. The third lens element with positive refractive power is made of plastic material and has a convex image-side surface, wherein an object-side surface and the image-side surface of the third lens element are aspheric. The fourth lens element with negative refractive power is made of plastic material, and has a concave object-side surface and a concave image-side surface, wherein the object-side surface and the image-side surface of the fourth lens element are aspheric, and the image-side surface of the fourth lens element changes from concave at the paraxial region to convex at the peripheral region.

25 Claims, 30 Drawing Sheets

IMAGE OPTICAL LENS SYSTEM

RELATED APPLICATIONS

The application claims priority to Taiwan Application Serial Number 100144226, filed Dec. 1, 2011, which is herein incorporated by reference.

BACKGROUND

1. Technical Field

The present invention relates to an image optical lens system. More particularly, the present invention relates to a compact image optical lens system applicable to electronic products.

2. Description of Related Art

In recent years, with the popularity of mobile products with camera functionalities, the demand for miniaturizing a photographing system is increasing. The sensor of a conventional photographing camera is typically a CCD (Charge-Coupled Device) or a CMOS (Complementary Metal-Oxide-Semiconductor) sensor. As advanced semiconductor manufacturing technologies have allowed the pixel size of sensors to be reduced and compact photographing systems have gradually evolved toward the field of higher megapixels, there is an increasing demand for compact photographing systems featuring better image quality.

A conventional compact photographing system in a portable electronic product typically utilizes a three-element lens structure. Such a conventional photographing system has a first lens element with positive refractive power, a second lens element with negative refractive power and a third lens element with positive refractive power. The first, second and third lens elements are arranged in this order from an object-side to an image-side. While the three-element lens structure is compact, it is not able to produce high quality images.

Another conventional compact photographing system provides a four-element lens structure. In order to retain high image quality, the smaller chief ray angle of the photographing system is proper corresponding to the image sensor, and provides the best photosensing performance of the image sensor. But, the back focal length and the total track length of the photographing system would be too long for applying to the compact electronic product.

Therefore, a need exists in the art for providing a photographing system for use in a mobile electronic product that has high pixel image sensor, large chief ray angle, and excellent imaging quality without too long total track length.

SUMMARY

According to one aspect of the present disclosure, an image optical lens system includes, in order from an object side to an image side, a first lens element, a second lens element, a third lens element and a fourth lens element. The first lens element with positive refractive power has a convex object-side surface. The second lens element has negative refractive power. The third lens element with positive refractive power is made of plastic material and has a convex image-side surface, wherein an object-side surface and the image-side surface of the third lens element are aspheric. The fourth lens element with negative refractive power is made of plastic material, and has a concave object-side surface and a concave image-side surface, wherein the object-side surface and the image-side surface of the fourth lens element are aspheric, and the image-side surface of the fourth lens element changes from concave at the paraxial region to convex at the peripheral region. When a maximum chief ray angle of the image optical lens system is CRA(Max), a curvature radius of the object-side surface of the third lens element is R5, a curvature radius of the image-side surface of the third lens element is R6, a central thickness of the first lens element is CT1, and a central thickness of the third lens element is CT3, the following relationships are satisfied:

33.5 degrees<CRA(Max)<45.0 degrees, 0.7<(R5+R6)/(R5−R6)<3.5; and 1.2<CT3/CT1<3.0.

According to another aspect of the present disclosure, an image optical lens system includes, in order from an object side to an image side, a first lens element, a second lens element, a third lens element and a fourth lens element. The first lens element with positive refractive power has a convex object-side surface. The second lens element with negative refractive power has a concave object-side surface. The third lens element with positive refractive power is made of plastic material and has a convex image-side surface, wherein an object-side surface and the image-side surface of the third lens element are aspheric. The fourth lens element with negative refractive power is made of plastic material and has a concave image-side surface, wherein an object-side surface and the image-side surface of the fourth lens element are aspheric, and the image-side surface of the fourth lens element changes from concave at the paraxial region to convex at the peripheral region. When the image optical lens system further includes a stop located between the first lens element and the second lens element, an axial distance between the stop and the image-side surface of the fourth lens element is SD, an axial distance between the object-side surface of the first lens element and the image-side surface of the fourth lens element is TD, and a maximum chief ray angle of the image optical lens system is CRA(Max), the following relationships are satisfied:

33.5 degrees<CRA(Max)<45.0 degrees; and 0.70<SD/TD<0.90.

According to yet another aspect of the present disclosure, an image optical lens system includes, in order from an object side to an image side, a first lens element, a second lens element, a third lens element and a fourth lens element. The first lens element with positive refractive power has a convex object-side surface. The second lens element with negative refractive power has a concave object-side surface. The third lens element with positive refractive power is made of plastic material, and has a concave object-side surface and a convex image-side surface, wherein the object-side surface and the image-side surface of the third lens element are aspheric. The fourth lens element with negative refractive power is made of plastic material and has a concave image-side surface, wherein an object-side surface and the image-side surface of the fourth lens element are aspheric, and the image-side surface of the fourth lens element changes from concave at the paraxial region to convex at the peripheral region. When a maximum chief ray angle of the image optical lens system is CRA(Max), the following relationship is satisfied:

33.5 degrees<CRA(Max)<45.0 degrees.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
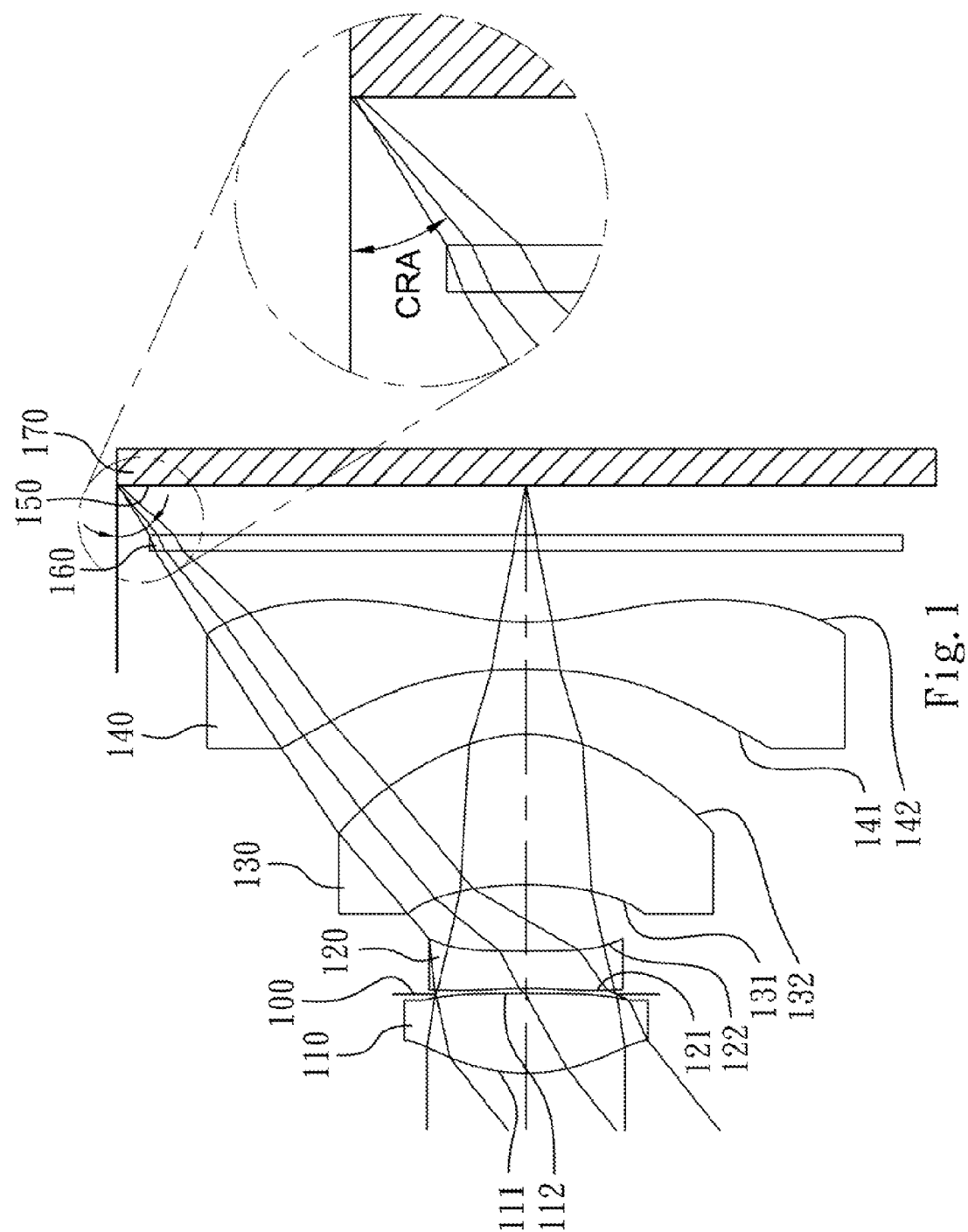
FIG. 1 is a schematic view of an image optical lens system according to the 1st embodiment of the present disclosure.

An image optical lens system includes, in order from an object side to an image side, a first lens element, a second lens element, a third lens element and a fourth lens element.

The first lens element with positive refractive power has a convex object-side surface, so that the total track length of the image optical lens system can be reduced by adjusting the positive refractive power of the first lens element.

The second lens element with negative refractive power corrects the aberration generated from the first lens element with positive refractive power. The second lens element can have a concave object-side surface and a concave image-side surface, so that the curvature of the surfaces of the second lens element are proper which can adjust the refractive power of the second lens element for further correcting the aberration of the image optical lens system.

The third lens element with positive refractive power distributes the positive refractive power of the first lens element, so that the sensitivity of the image optical lens system can be reduced. The third lens element has a concave object-side surface and a convex image-side surface, so that the astigmatism of the image optical lens system can be corrected.

The fourth lens element with negative refractive power has a concave image-side surface, so that the principal point of the image optical lens system can be positioned away from the image plane, and the total track length of the image optical lens system can be reduced so as to maintain the compact size of the image optical lens system. When the fourth lens element has a concave object-side surface and a concave image-side surface, the total track length of the image optical lens system can further be reduced. Moreover, the image-side surface of the fourth lens element changes from concave at the paraxial region to convex at the peripheral region, so that the aberration of the off-axis field on the image sensor can be effectively corrected and the resolving power can be enhanced.

When a maximum chief ray angle of the image optical lens system is CRA(Max), wherein the chief ray angle (CRA) is an angle between the light which passes through the center of an aperture stop and the optical axis, the following relationship is satisfied:

33.5 degrees<CRA(Max)<45.0 degrees.

Therefore, when the image optical lens system is configured with the specified chief ray angle, the back focal length of the image optical lens system can be reduced, and the total track length can be also reduced for applying to the compact electronic product.

CRA(Max) can further satisfy the following relationship:

34.2 degrees<CRA(Max)<45.0 degrees.

When a curvature radius of the object-side surface of the third lens element is R5, and a curvature radius of the image-side surface of the third lens element is R6, the following relationship is satisfied:

$0.7<(R5+R6)/(R5-R6)<3.5.$

Therefore, the astigmatism of the image optical lens system can be corrected by adjusting the curvature of the object-side surface and the image-side surface of the third lens element.

R5 and R6 can further satisfy the following relationship:

$1.0<(R5+R6)/(R5-R6)<3.5.$

When a central thickness of the first lens element is CT1, and a central thickness of the third lens element is CT3, the following relationship is satisfied:

$1.2<CT3/CT1<3.0.$

Therefore, the thickness of the first lens element and the third lens element are proper for reducing the total track length of the image optical lens system, and then the aberration thereof can be corrected effectively. Moreover, when the foregoing relationship is satisfied, the manufacture and fabrication of the lens elements are easier, and the yield rate can also be increased.

When a focal length of the image optical lens system is f, and a focal length of the fourth lens element is f4, the following relationship is satisfied:

$-0.8<f4/f<-0.3.$

Therefore, the refractive power of the fourth lens element can reduce the back focal length of the image optical lens system and correct the aberration thereof.

f and f4 can further satisfy the following relationship:

$-0.65<f4/f<-0.3$

The image optical lens system further includes an image sensor located on an image plane. When an image height of the image optical lens system is a half of the horizontal length of the photosensitive area of the image sensor, the chief ray angle of the image optical lens system is CRA(H), and the following relationship is satisfied:

$32.0\ degrees<CRA(H)<45.0\ degrees.$

Therefore, the back focal length of the image optical lens system can be reduced for maintaining compact size of the image optical lens system.

When the Abbe number of the first lens element is V1, and the Abbe number of the second lens element is V2, the following relationship is satisfied:

$30<V1-V2<50.$

Therefore, the chromatic aberration of the image optical lens system can be corrected.

The image optical lens system further includes a stop. When an axial distance between the stop and the image-side surface of the fourth lens element is SD, and an axial distance between the object-side surface of the first lens element and the image-side surface of the fourth lens element is TD, the following relationship is satisfied:

$0.70<SD/TD<0.90.$

Therefore, the image optical lens system has a favorable balance between the telecentric and wide-angle characteristics, and a desirable field of view of the image optical lens system can be maintained, and the total track length thereof would not be too long.

When a maximum image height of the image optical lens system is ImgH, and an axial distance between the object-side surface of the first lens element and an image plane is TTL, the following relationship is satisfied:

$TTL/ImgH<1.60.$

Therefore, the total track length of the image optical lens system can be reduced so as to maintain the compact size of the image optical lens system for portable electronic products.

When the focal length of the image optical lens system is f, and a focal length of the second lens element is f2, the following relationship is satisfied:

$-0.9<f/f2<-0.3$

Therefore, the negative refractive power of the second lens element can correct the aberration generated from the first lens element with positive refractive power.

When the image height of the image optical lens system is a half of the horizontal length of the photosensitive area of the image sensor, the chief ray angle of the image optical lens system is CRA(H), and the maximum chief ray angle of the image optical lens system is CRA(Max), the following relationship is satisfied:

$CRA(Max)-CRA(H)<3.5\ degrees.$

By the foregoing arrangement, the chief ray angle of the image optical lens system would not be too large, so that the image quality and the distribution of the illumination can be maintained.

According to the image optical lens system of the present disclosure, the lens elements thereof can be made of glass or plastic material. When the lens elements are made of glass material, the distribution of the refractive power of the image optical lens system may be more flexible for design. When the lens elements are made of plastic material, the cost of manufacture can be effectively reduced. Furthermore, the surface of each lens element can be aspheric, so that it is easier to make the surface into non-spherical shapes. As a result, more controllable variables are obtained, and the aberration is reduced, as well as the number of required lens elements can be reduced while constructing an optical system. Therefore, the total track length of the image optical lens system can also be reduced.

According to the image optical lens system of the present disclosure, when the lens element has a convex surface, it indicates that the paraxial region of the surface is convex; and when the lens element has a concave surface, it indicates that the paraxial region of the surface is concave.

According to the image optical lens system of the present disclosure, the image optical lens system can include at least one stop, such as an aperture stop, glare stop, field stop, etc. Said glare stop or said field stop is allocated for reducing stray light while retaining high image quality. Furthermore, when the stop is an aperture stop, the position of the aperture stop within an optical system can be arbitrarily placed in front of the entire optical system, within the optical system, or in front of the image plane in accordance with the preference of the optical designer, in order to achieve the desirable optical features or higher image quality produced from the optical system.

According to the above description of the present disclosure, the following 1st-10th specific embodiments are provided for further explanation.

1st Embodiment

Figure 2:
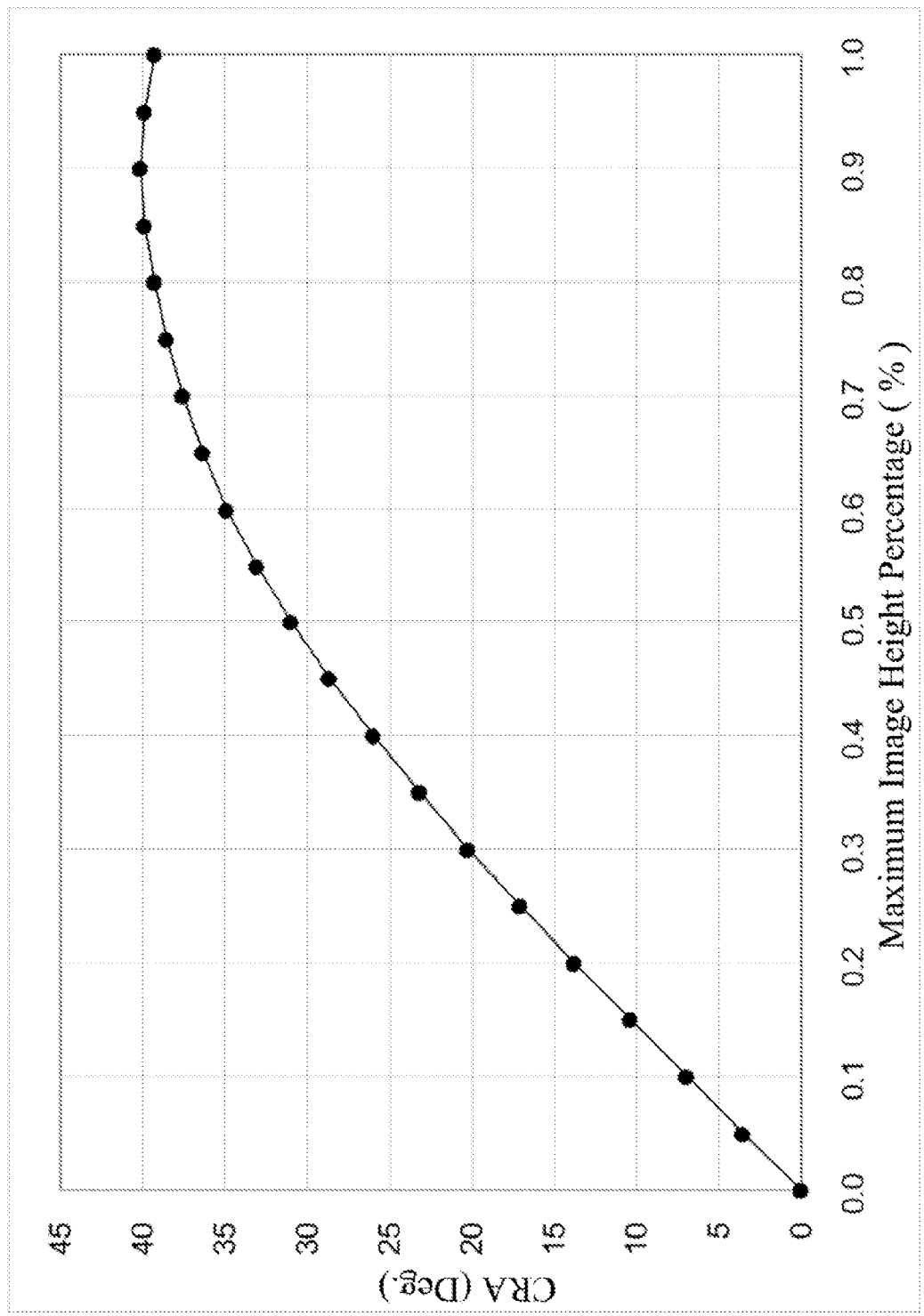
FIG. 2 is a relationship diagram of the CRA (y-axial) and the maximum image height percentage (x-axial) of the image optical lens system according to the 1st embodiment.
Figure 3:
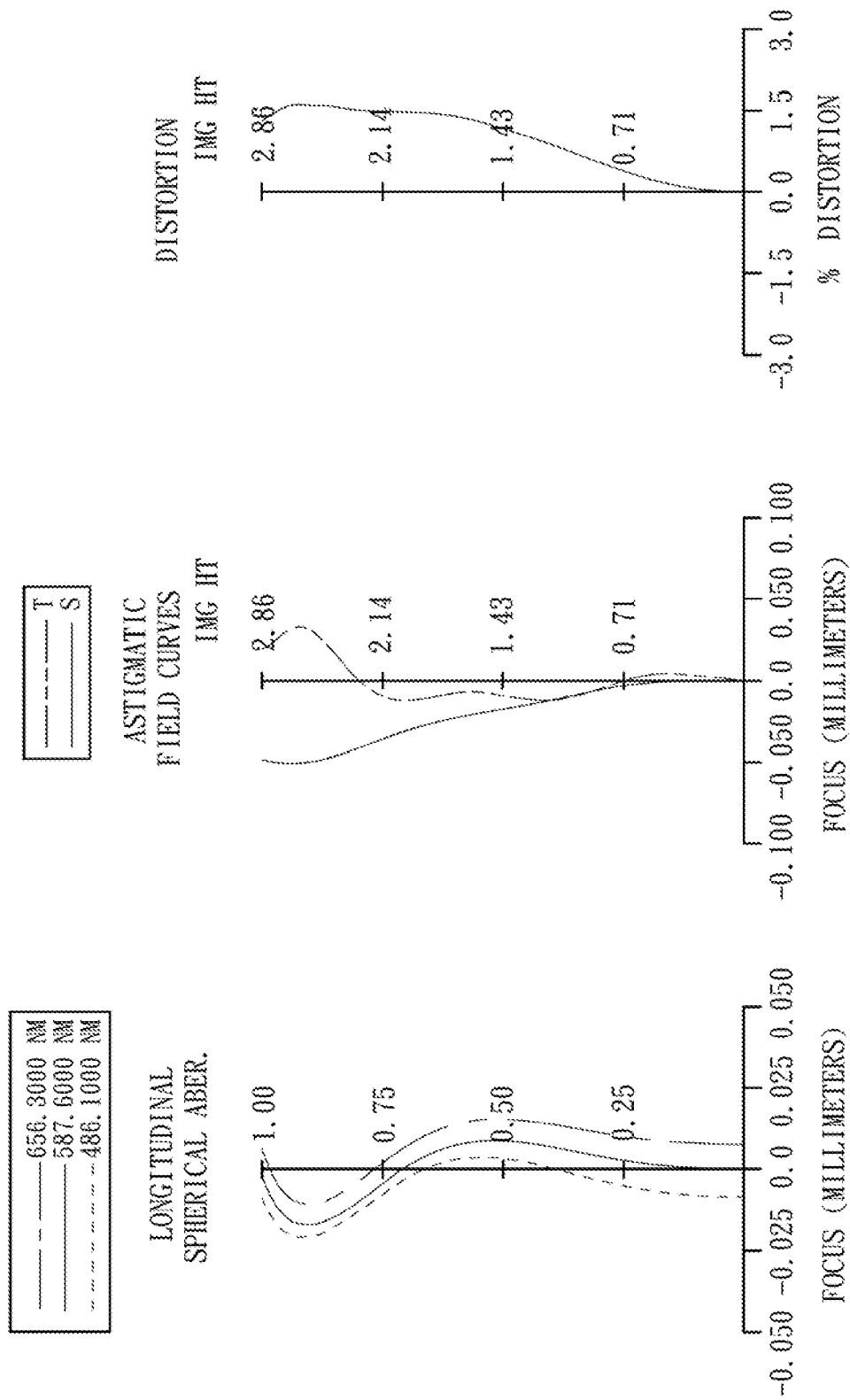
FIG. 3 shows spherical aberration curves, astigmatic field curves and a distortion curve of the image optical lens system according to the 1st embodiment.

FIG. 1 is a schematic view of an image optical lens system according to the 1st embodiment of the present disclosure FIG. 2 is a relationship diagram of the CRA (y-axial) and the maximum image height percentage (x-axial) of the image optical lens system according to the 1st embodiment. FIG. 3 shows spherical aberration curves, astigmatic field curves and a distortion curve of the image optical lens system according to the 1st embodiment. In FIG. 1, the image optical lens system includes, in order from an object side to an image side, the first lens element 110, an aperture stop 100, the second lens element 120, the third lens element 130, the fourth lens element 140, an IR-filter 160, an image plane 150 and an image sensor 170.

The first lens element 110 with positive refractive power has a convex object-side surface 111 and a convex image-side surface 112, and is made of plastic material. The object-side surface 111 and the image-side surface 112 of the first lens element 110 are aspheric.

The second lens element 120 with negative refractive power has a concave object-side surface 121 and a concave image-side surface 122, and is made of plastic material. The object-side surface 121 and the image-side surface 122 of the second lens element 120 are aspheric.

The third lens element 130 with positive refractive power has a concave object-side surface 131 and a convex image-side surface 132, and is made of plastic material. The object-side surface 131 and the image-side surface 132 of the third lens element 130 are aspheric.

The fourth lens element 140 with negative refractive power has a concave object-side surface 141 and a concave image-side surface 142, and the image-side surface 142 of the fourth lens element 140 changes from concave at the paraxial region to convex at the peripheral region. The fourth lens element 140 is made of plastic material, and the object-side surface 141 and the image-side surface 142 thereof are aspheric.

The IR-filter 160 is made of glass and located between the fourth lens element 140 and the image plane 150, and will not affect the focal length of the image optical lens system.

The equation of the aspheric surface profiles of the aforementioned lens elements of the 1st embodiment expressed as follows $$X(Y) = (Y^2/R)/(1 + sqrt(1 - (1+k) \times (Y/R)^2)) + \sum_i (Ai) \times (Y^i)$$

where:

X is the distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the image optical lens system according to the 1st embodiment, when a focal length of the image optical lens system is f, an f-number of the image optical lens system is Fno, and a half of the maximal field of view is HFOV, these parameters have the following values:

f=3.52 mm;
Fno=2.55; and
HFOV=38.7 degrees.

In the mage optical lens system according to the 1st embodiment, when the Abbe number of the first lens element 110 is V1, and the Abbe number of the second lens element 120 is V2, the following relationship is satisfied:

$V1-V2=34.5$.

In the image optical lens system according to the 1st embodiment, when a central thickness of the first lens element 110 is CT1, and a central thickness of the third lens element 130 is CT3, the following relationship is satisfied:

$CT3/CT1=1.89$.

In the image optical lens system according to the 1st embodiment, when a curvature radius of the object-side surface 131 of the third lens element 130 is R5, and a curvature radius of the image-side surface 132 of the third lens element 130 is R6, the following relationship is satisfied:

$(R5+R6)/(R5-R6)=2.67$.

In the image optical lens system according to the 1st embodiment, when the focal length of the image optical lens system is f, a focal length of the second lens element 120 is f2, and a focal length of the fourth lens element 140 is f4, the following relationships are satisfied:

$f/f2=-0.66$; and $f4/f=-0.58$.

In the image optical lens system according to the 1st embodiment, when an axial distance between the aperture stop 100 and the image-side surface 142 of the fourth lens element 140 is SD, and an axial distance between the object-side surface 111 of the first lens element 110 and the image-side surface 142 of the fourth lens element 140 is TD, the following relationship is satisfied:

$SD/TD=0.83$.

In the image optical lens system according to the 1st embodiment, when a maximum image height of the image optical lens system is ImgH which here is a half of the diagonal length of the photosensitive area of the image sensor 170 on the image plane 150, and an axial distance between the object-side surface 111 of the first lens element 110 and an image plane 150 is TTL, the following relationship is satisfied:

$TTL/ImgH=1.43$.

In the image optical lens system according to the 1st embodiment, the pixel size of the image sensor 170 is 1.4 um, wherein the horizontal direction of the image sensor 170 is 3264 pixels, and the vertical direction of the image sensor 170 is 2448 pixels. In the magnified part of FIG. 1, the chief ray angle (CRA) is an angle between the light which passes through the center of the aperture stop 100 and the optical axis, and the drawings of the magnified viewed CRA will not be repeated in the following embodiments. In FIG. 2, a maximum chief ray angle of the image optical lens system is CRA(Max), when an image height of the image optical lens system is a half of the horizontal length of the photosensitive area of the image sensor 170, the chief ray angle of the image optical lens system is CRA(H), when the image height of the image optical lens system is a half of the diagonal length of the photosensitive area of the image sensor 170, the chief ray angle of the image optical lens system is CRA(D), and when the image height of the image optical lens system is a half of the vertical length of the photosensitive area of the image sensor 170, the chief ray angle of the image optical lens system is CRA(V), the following relationships are satisfied:

$CRA(Max)=40.1$ degrees;

$CRA(H)=39.3$ degrees;

$CRA(Max)-CRA(H)=0.8$ degrees;

CRA(D)=392 degrees; and

CRA(V)=34.8 degrees.

The detailed optical data of the 1st embodiment are shown in Table 1, the aspheric surface data are shown in Table 2, and the maximum image height percentage are shown in Table 3 below.

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. In Table 3, the

TABLE 1

1st Embodiment
f = 3.52 mm, Fno = 2.55, HFOV = 38.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.292950 (ASP) | 0.557 | Plastic | 1.544 | 55.9 | 2.20 |
| 2 | | −13.959800 (ASP) | −0.006 | | | | |
| 3 | Ape. Stop | Plano | 0.040 | | | | |
| 4 | Lens 2 | −4.558700 (ASP) | 0.262 | Plastic | 1.650 | 21.4 | −5.34 |
| 5 | | 14.820600 (ASP) | 0.464 | | | | |
| 6 | Lens 3 | −2.388170 (ASP) | 1.051 | Plastic | 1.544 | 55.9 | 2.86 |
| 7 | | −1.087410 (ASP) | 0.454 | | | | |
| 8 | Lens 4 | −3.699700 (ASP) | 0.330 | Plastic | 1.544 | 55.9 | −2.03 |
| 9 | | 1.622440 (ASP) | 0.500 | | | | |
| 10 | IR-Filter | Plano | 0.110 | Glass | 1.517 | 64.2 | — |
| 11 | | Plano | 0.349 | | | | |
| 12 | Image | Plano | — | | | | |

Note:
Reference wavelength (d-line) is 587.6 nm.

TABLE 2

Aspheric Coefficients

| Surface # | 1 | 2 | 4 | 5 |
|---|---|---|---|---|
| k = | −6.23310E−01 | 1.00000E+00 | −4.33362E+01 | 5.00000E+01 |
| A4 = | 9.30866E−03 | −5.81695E−02 | 1.82683E−01 | 3.42930E−01 |
| A6 = | −6.29810E−02 | −2.50483E−02 | −1.09737E−02 | −5.67721E−02 |
| A8 = | 4.82118E−02 | −2.17803E−01 | 1.58387E−02 | 2.25913E−01 |
| A10 = | −2.85265E−01 | 1.51411E−01 | 4.09189E−02 | |
| A12 = | | | 5.46540E−02 | |

| Surface # | 6 | 7 | 8 | 9 |
|---|---|---|---|---|
| k = | 2.81613E+00 | −4.06748E+00 | 1.04647E+00 | −1.08003E+01 |
| A4 = | −1.85021E−02 | −1.48166E−01 | −7.22113E−02 | −7.37793E−02 |
| A6 = | −1.00809E−02 | 1.09010E−01 | 3.04849E−02 | 2.93470E−02 |
| A8 = | −5.60803E−02 | −4.08772E−02 | −1.83330E−03 | −8.53251E−03 |
| A10 = | −2.52106E−01 | −1.28233E−02 | −5.23816E−04 | 1.31579E−03 |
| A12 = | 4.31401E−01 | 1.02305E−02 | −1.20641E−04 | −2.91718E−05 |
| A14 = | −5.29574E−02 | 2.08439E−03 | 4.45191E−05 | −1.88008E−05 |
| A16 = | −3.44417E−01 | −1.89201E−03 | −1.52191E−06 | 1.70109E−06 |

TABLE 3

| Maximum Image Height Percentage (%) | Image Height (mm) | CRA (Deg.) | Maximum Image Height Percentage (%) | Image Height (mm) | CRA (Deg.) |
|---|---|---|---|---|---|
| 0.00 | 0.000 | 0.0 | 0.55 | 1.571 | 33.0 |
| 0.05 | 0.143 | 3.5 | 0.60 | 1.714 | 34.8 |
| 0.10 | 0.286 | 7.0 | 0.65 | 1.856 | 36.4 |
| 0.15 | 0.428 | 10.4 | 0.70 | 1.999 | 37.6 |
| 0.20 | 0.571 | 13.8 | 0.75 | 2.142 | 38.6 |
| 0.25 | 0.714 | 17.1 | 0.80 | 2.285 | 39.3 |
| 0.30 | 0.857 | 20.2 | 0.85 | 2.428 | 39.8 |
| 0.35 | 1.000 | 23.2 | 0.90 | 2.570 | 40.1 |
| 0.40 | 1.142 | 26.0 | 0.95 | 2.713 | 39.9 |
| 0.45 | 1.285 | 28.6 | 1.00 | 2.856 | 39.2 |
| 0.50 | 1.428 | 31.0 | | | | maximum image height percentage, the corresponding image height, and CPA thereof are shown. This information related to Table 1, Table 2 and Table 3 applies also to the Tables for the remaining embodiments, and so an explanation in this regard will not be provided again.

2nd Embodiment

Figure 4:
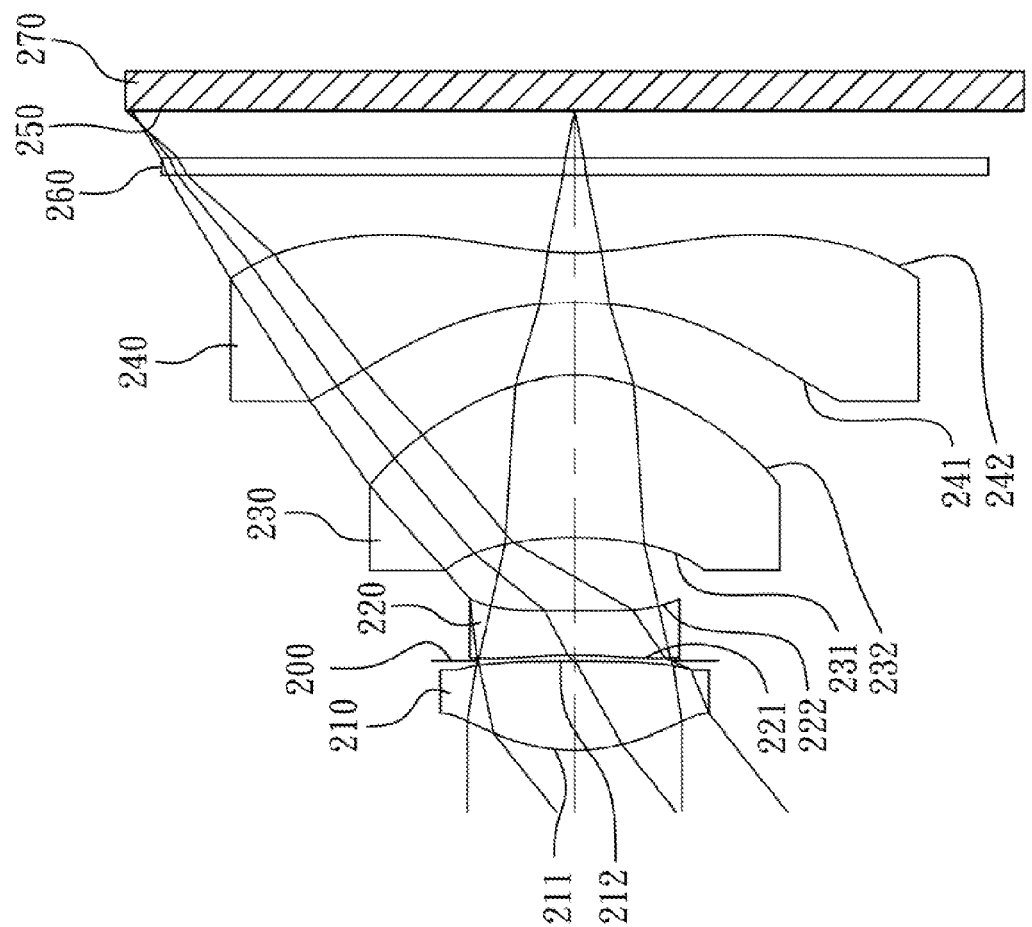
FIG. 4 is a schematic view of an image optical lens system according to the 2nd embodiment of the present disclosure.
Figure 5:
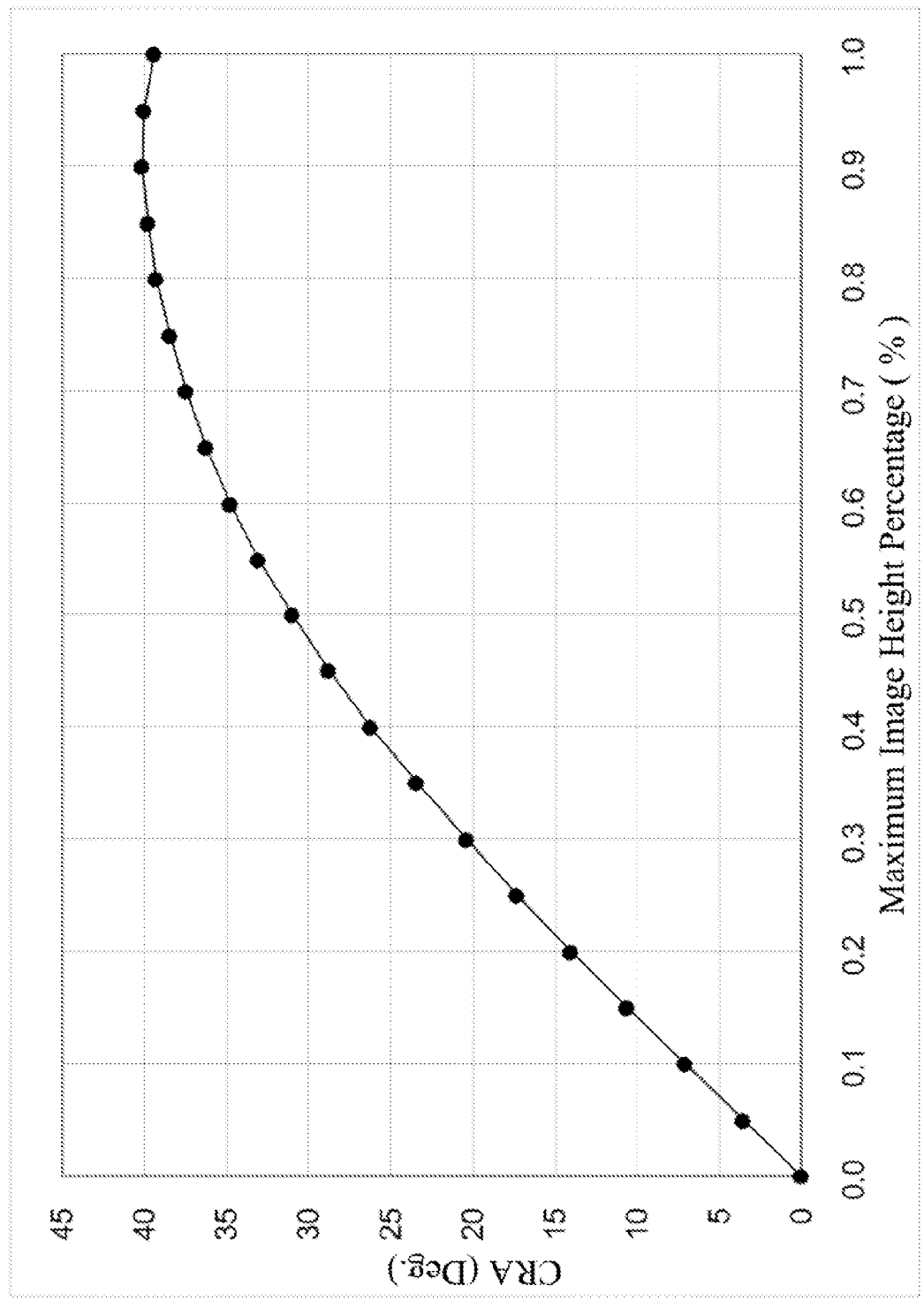
FIG. 5 is a relationship diagram of the CRA (y-axial) and the maximum image height percentage (x-axial) of the image optical lens system according to the 2nd embodiment.
Figure 6:
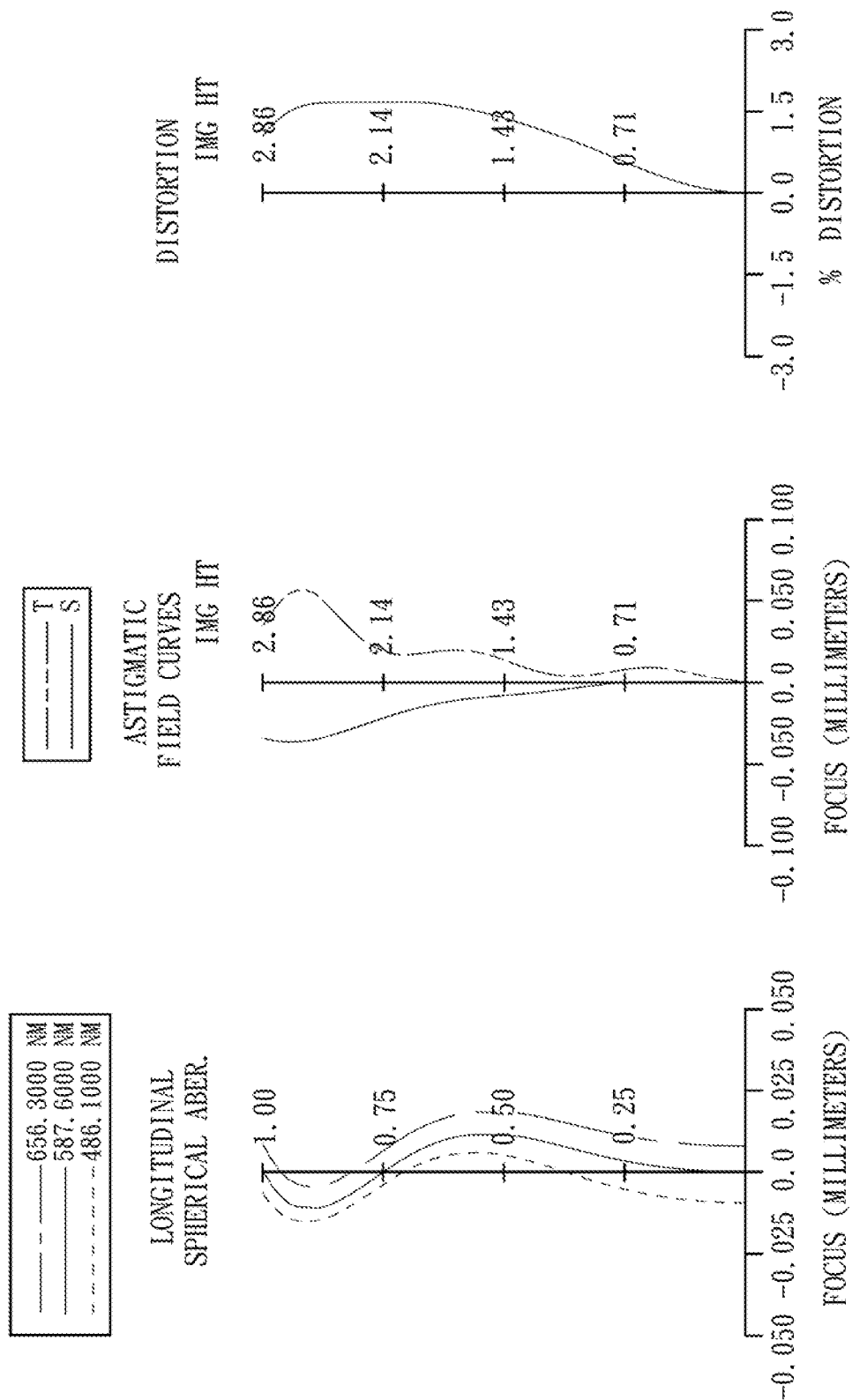
FIG. 6 shows spherical aberration curves, astigmatic field curves and a distortion curve of the image optical lens system according to the 2nd embodiment.

FIG. 4 is a schematic view of an image optical lens system according to the 2nd embodiment of the present disclosure. FIG. 5 is a relationship diagram of the CRA (y-axial) and the maximum image height percentage (x-axial) of the image optical lens system according to the 2nd embodiment. FIG. 6 shows spherical aberration curves, astigmatic field curves and a distortion curve of the image optical lens system according to the 2nd embodiment. In FIG. 4, the image optical lens system includes, in order from an object side to an image side, the first lens element 210, an aperture stop 200, the second lens element 220, the third lens element 230, the fourth lens element 240, an IR-filter 260, an image plane 250 and an image sensor 270.

The first lens element 210 with positive refractive power has a convex object-side surface 211 and a convex image-side surface 212, and is made of plastic material. The object-side surface 211 and the mage-side surface 212 of the first lens element 210 are aspheric.

The second lens element 220 with negative refractive power has a concave object-side surface 221 and a convex image-side surface 222, and is made of plastic material. The object-side surface 221 and the image-side surface 222 of the second lens element 220 are aspheric.

The third lens element 230 with positive refractive power has a concave object-side surface 231 and a convex image-side surface 232, and is made of plastic material. The object-side surface 231 and the image-side surface 232 to of the third lens element 230 are aspheric.

The fourth lens element 240 with negative refractive power has a concave object-side surface 241 and a concave image-side surface 242, and the image-side surface 242 of the fourth lens element 240 changes from concave at the paraxial region to convex at the peripheral region. The fourth lens element 240 is made of plastic material, and the object-side surface 241 and the image-side surface 242 thereof are aspheric.

The IR-filter 260 is made of glass and located between the fourth lens element 240 and the image plane 250, and will not affect the focal length of the image optical lens system.

In the image optical lens system according to the 2nd embodiment, the pixel size of the image sensor 270 is 1.4 um, wherein the horizontal direction of the image sensor 270 is 3264 pixels, and the vertical direction of the image sensor 270 is 2448 pixels.

The detailed optical data of the 2nd embodiment are shown in Table 4, the aspheric surface data are shown in Table 5, and the maximum image height percentage are shown in Table 6 below.

TABLE 6

| Maximum Image Height Percentage (%) | Image Height (mm) | CRA (Deg.) | Maximum Image Height Percentage (%) | Image Height (mm) | CRA (Deg.) |
|---|---|---|---|---|---|
| 0.00 | 0.000 | 0.0 | 0.55 | 1.571 | 33.0 |
| 0.05 | 0.143 | 3.6 | 0.60 | 1.714 | 34.8 |
| 0.10 | 0.286 | 7.1 | 0.65 | 1.856 | 36.3 |
| 0.15 | 0.428 | 10.6 | 0.70 | 1.999 | 37.5 |
| 0.20 | 0.571 | 14.0 | 0.75 | 2.142 | 38.5 |
| 0.25 | 0.714 | 17.3 | 0.80 | 2.285 | 39.2 |
| 0.30 | 0.857 | 20.4 | 0.85 | 2.428 | 39.8 |
| 0.35 | 1.000 | 23.4 | 0.90 | 2.570 | 40.1 |
| 0.40 | 1.142 | 26.2 | 0.95 | 2.713 | 40.1 |
| 0.45 | 1.285 | 28.7 | 1.00 | 2.856 | 39.4 |
| 0.50 | 1.428 | 31.0 | | | |

TABLE 4

2nd Embodiment
f = 3.56 mm, Fno = 2.58, HFOV = 38.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.278900 (ASP) | 0.568 | Plastic | 1.544 | 55.9 | 2.18 |
| 2 | | −13.669800 (ASP) | 0.004 | | | | |
| 3 | Ape. Stop | Plano | 0.037 | | | | |
| 4 | Lens 2 | −3.542100 (ASP) | 0.283 | Plastic | 1.650 | 21.4 | −5.56 |
| 5 | | −181.818200 (ASP) | 0.474 | | | | |
| 6 | Lens 3 | −2.336410 (ASP) | 1.042 | Plastic | 1.544 | 55.9 | 3.00 |
| 7 | | −1.111500 (ASP) | 0.466 | | | | |
| 8 | Lens 4 | −2.544610 (ASP) | 0.320 | Plastic | 1.544 | 55.9 | −2.01 |
| 9 | | 2.009870 (ASP) | 0.500 | | | | |
| 10 | IR-Filter | Plano | 0.110 | Glass | 1.517 | 64.2 | — |
| 11 | | Plano | 0.307 | | | | |
| 12 | Image | Plano | — | | | | |

Note:
Reference wavelength (d-line) is 587.6 nm.

TABLE 5

Aspheric Coefficients

| Surface # | 1 | 2 | 4 | 5 |
|---|---|---|---|---|
| k = | −6.26957E−01 | −5.00000E+01 | −3.37851E+01 | −5.00000E+01 |
| A4 = | 8.03981E−03 | −5.43215E−02 | 1.77191E−01 | 3.63911E−01 |
| A6 = | −5.17989E−02 | −1.99449E−02 | −1.17447E−03 | −7.67522E−02 |
| A8 = | 4.90785E−02 | −2.08089E−01 | 4.35262E−02 | 2.65532E−01 |
| A10 = | −3.00999E−01 | 1.00530E−01 | −1.89814E−02 | |
| A12 = | | | 5.46544E−02 | |

| Surface # | 6 | 7 | 8 | 9 |
|---|---|---|---|---|
| k = | 2.97722E+00 | −3.95897E+00 | −1.73859E+00 | −1.46948E+01 |
| A4 = | −2.93012E−02 | −1.53420E−01 | −7.22113E−02 | −7.37793E−02 |
| A6 = | 1.45347E−02 | 1.10260E−01 | 3.04849E−02 | 2.93470E−02 |
| A8 = | −5.21446E−02 | −3.98244E−02 | −1.83330E−03 | −8.53251E−03 |
| A10 = | −2.88862E−01 | −1.30461E−02 | −5.23816E−04 | 1.31579E−03 |
| A12 = | 4.31401E−01 | 9.83272E−03 | −1.20641E−04 | −2.91718E−05 |
| A14 = | −5.29572E−02 | 2.00489E−03 | 4.45191E−05 | −1.88008E−05 |
| A16 = | −3.44417E−01 | −1.77343E−03 | −1.52191E−06 | 1.70109E−06 |

In the image optical lens system according to the 2nd embodiment, the definitions of f, Fno, HFOV, V1, V2, CT1, CT3, R5, R6, f2, f4, SD, TD, TTL, ImgH, CRA(Max), CRA(H), CRA(D) and CRA(V) are the same as those stated in the 1st embodiment with corresponding values for the 2nd embodiment. Moreover, these parameters can be calculated from Tables 4-6 as the following values and satisfy the following relationships:

| f(mm) | 3.56 | SD/TD | 0.82 |
|---|---|---|---|
| Fno | 2.58 | TTL/ImgH | 1.43 |
| HFOV (deg.) | 38.5 | CRA(Max) (deg.) | 40.1 |
| V1 − V2 | 34.5 | CRA(H) (deg.) | 39.2 |
| CT3/CT1 | 1.84 | CRA(Max) − CRA(H) (deg.) | 0.9 |
| (R5 + R6)/(R5 − R6) | 2.81 | CRA(D) (deg.) | 39.4 |
| f/f2 | −0.64 | CRA(V) (deg.) | 34.8 |
| f4/f | −0.57 | | |

3rd Embodiment

Figure 7:
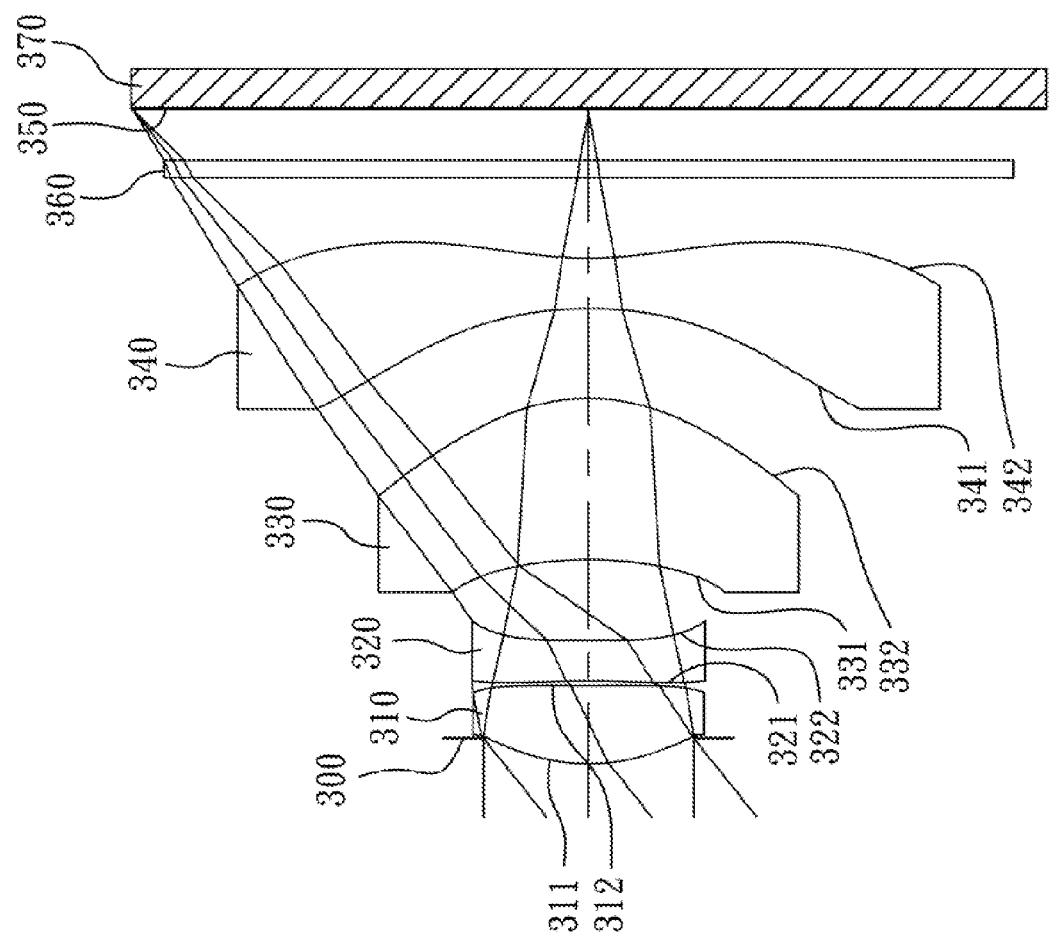
FIG. 7 is a schematic view of an image optical lens system according to the 3rd embodiment of the present disclosure.
Figure 8:
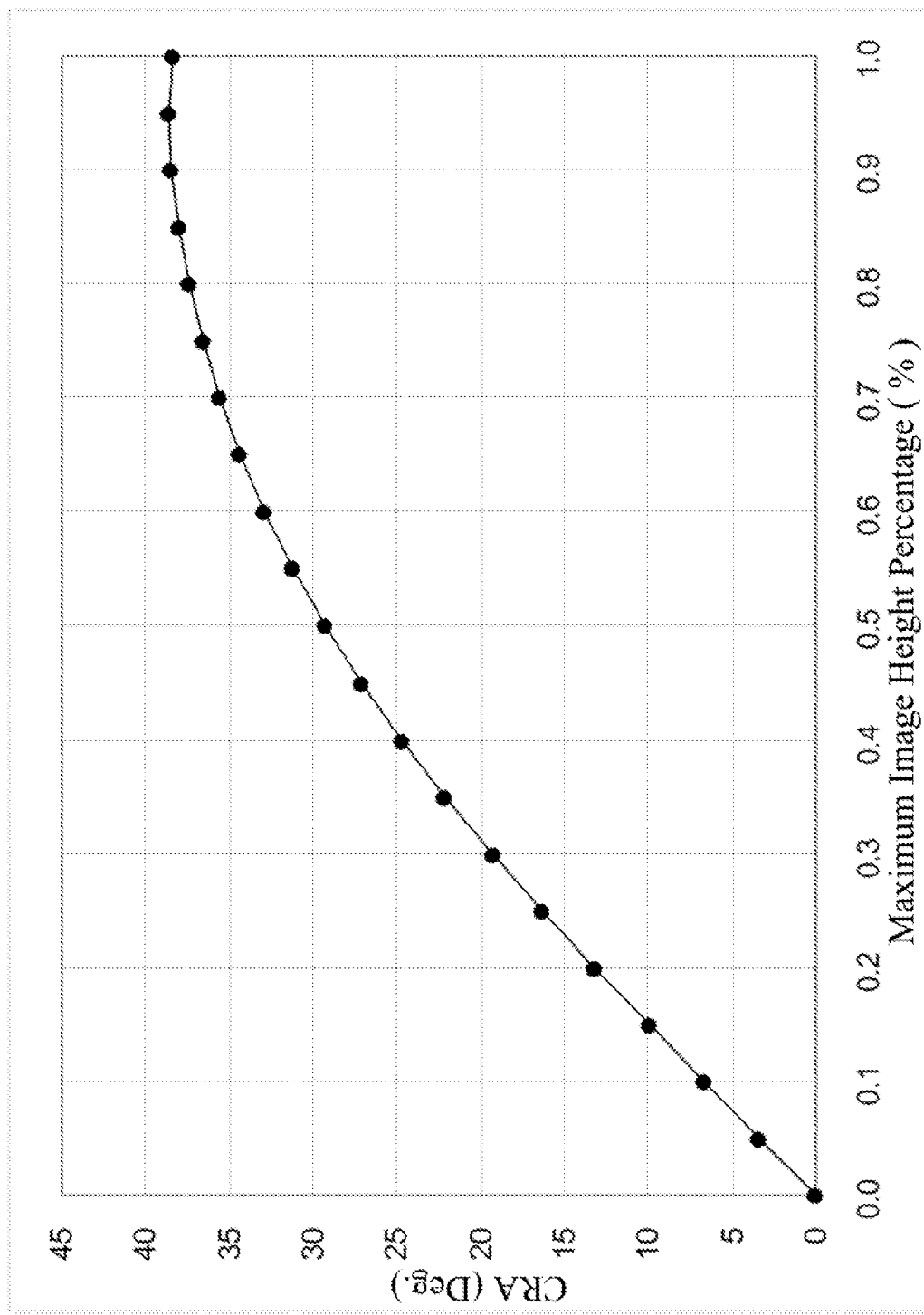
FIG. 8 is a relationship diagram of the CRA (y-axial) and the maximum image height percentage (x-axial) of the image optical lens system according to the 3rd embodiment.
Figure 9:
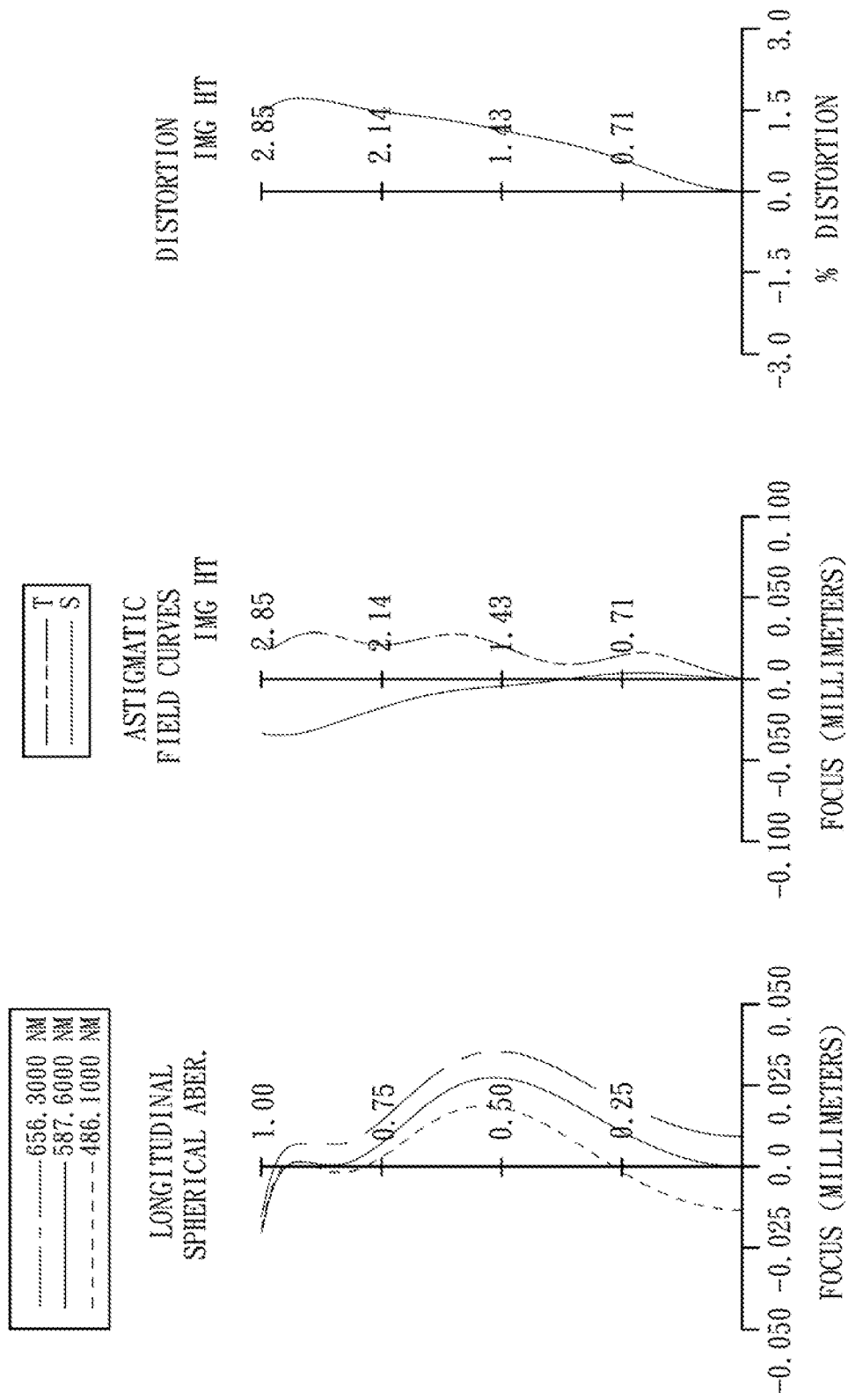
FIG. 9 shows spherical aberration curves, astigmatic field curves and a distortion curve of the image optical lens system according to the 3rd embodiment.

FIG. 7 is a schematic view of an image optical lens system according to the 3rd embodiment of the present disclosure. FIG. 8 is a relationship diagram of the CRA (y-axial) and the maximum image height percentage (x-axial) of the image optical lens system according to the 3rd embodiment. FIG. 9 shows spherical aberration curves, astigmatic field curves and a distortion curve of the image optical lens system according to the 3rd embodiment. In FIG. 7, the image optical lens system includes, in order from an object side to an image side, an aperture stop 300, the first lens element 310, the second lens element 320, the third lens element 330, the fourth lens element 340, an IR-filter 360, an image plane 350 and an image sensor 370.

The first lens element 310 with positive refractive power has a convex object-side surface 311 and a concave image-side surface 312, and is made of plastic material. The object-side surface 311 and the image-side surface 312 of the first lens element 310 are aspheric.

The second lens element 320 with negative refractive power has a concave object-side surface 321 and a concave image-side surface 322, and is made of plastic material. The object-side surface 321 and the image-side surface 322 of the second lens element 320 are aspheric.

The third lens element 330 with positive refractive power has a concave object-side surface 331 and a convex image-side surface 332, and is made of plastic material. The object-side surface 331 and the image-side surface 332 of the third lens element 330 are aspheric.

The fourth lens element 340 with negative refractive power has a concave object-side surface 341 and a concave image-side surface 342, and the image-side surface 342 of the fourth lens element 340 changes from concave at the paraxial region to convex at the peripheral region. The fourth lens element 340 is made of plastic material, and the object-side surface 341 and the image-side surface 342 thereof are aspheric.

The IR-filter 360 is made of glass and located between the fourth lens element 340 and the image plane 350, and will not affect the focal length of the image optical lens system.

In the image optical lens system according to the 3rd embodiment, the pixel size of the image sensor 370 is 1.4 um, wherein the horizontal direction of the image sensor 370 is 3264 pixels, and the vertical direction of the image sensor 370 is 2448 pixels.

The detailed optical data of the 3rd embodiment are shown in Table 7, the aspheric surface data are shown in Table 8, and the maximum image height percentage are shown in Table 9 below.

TABLE 7

3rd Embodiment
f = 3.55 mm, Fno = 2.70, HFOV = 38.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.160 | | | | |
| 2 | Lens 1 | 1.249240 (ASP) | 0.485 | Plastic | 1.544 | 55.9 | 2.34 |
| 3 | | 62.111800 (ASP) | 0.030 | | | | |
| 4 | Lens 2 | −5.022100 (ASP) | 0.256 | Plastic | 1.650 | 21.4 | −6.43 |
| 5 | | 25.249600 (ASP) | 0.502 | | | | |
| 6 | Lens 3 | −2.496260 (ASP) | 1.014 | Plastic | 1.544 | 55.9 | 3.18 |
| 7 | | −1.168720 (ASP) | 0.557 | | | | |
| 8 | Lens 4 | −2.489770 (ASP) | 0.320 | Plastic | 1.544 | 55.9 | −2.14 |
| 9 | | 2.289280 (ASP) | 0.500 | | | | |
| 10 | IR-Filter | Plano | 0.110 | Glass | 1.517 | 64.2 | — |
| 11 | | Plano | 0.325 | | | | |
| 12 | Image | Plano | — | | | | |

Note:
Reference wavelength (d-line) is 587.6 nm.

TABLE 8

Aspheric Coefficients

| Surface # | 2 | 3 | 4 | 5 |
|---|---|---|---|---|
| k = | −5.71935E−01 | 1.00000E+00 | −3.12289E+01 | 6.62391E+02 |
| A4 = | 1.19684E−02 | −6.65790E−02 | 1.88362E−01 | 3.47638E−01 |
| A6 = | −7.05190E−02 | −9.99041E−02 | 8.29874E−03 | −3.45047E−02 |
| A8 = | 2.06863E−01 | −4.93791E−02 | −1.66602E−01 | 2.01320E−01 |
| A10 = | −6.69376E−01 | −3.30365E−01 | 1.12477E−01 | |
| A12 = | | | 5.46547E−02 | |

| Surface # | 6 | 7 | 8 | 9 |
|---|---|---|---|---|
| k = | 2.74106E+00 | −4.10601E+00 | −2.00904E+00 | −1.56081E+01 |
| A4 = | −2.99671E−02 | −1.51867E−01 | −7.22113E−02 | −7.37793E−02 |
| A6 = | 3.26709E−02 | 1.13243E−01 | 3.04849E−02 | 2.93470E−02 |
| A8 = | −2.49088E−02 | −3.42783E−02 | −1.83330E−03 | −8.53251E−03 |
| A10 = | −2.88412E−01 | −9.08267E−03 | −5.23816E−04 | 1.31579E−03 |
| A12 = | 4.31273E−01 | 9.51520E−03 | −1.20641E−04 | −2.91718E−05 |
| A14 = | −5.31599E−02 | −1.17512E−03 | 4.45191E−05 | −1.88008E−05 |
| A16 = | −3.44417E−01 | −4.93496E−04 | −1.52191E−06 | 1.70109E−06 |

TABLE 9

| Maximum Image Height Percentage (%) | Image Height (mm) | CRA (Deg.) | Maximum Image Height Percentage (%) | Image Height (mm) | CRA (Deg.) |
|---|---|---|---|---|---|
| 0.00 | 0.000 | 0.0 | 0.55 | 1.571 | 31.2 |
| 0.05 | 0.143 | 3.4 | 0.60 | 1.714 | 32.9 |
| 0.10 | 0.286 | 6.7 | 0.65 | 1.856 | 34.3 |
| 0.15 | 0.428 | 10.0 | 0.70 | 1.999 | 35.5 |
| 0.20 | 0.571 | 13.2 | 0.75 | 2.142 | 36.5 |
| 0.25 | 0.714 | 16.3 | 0.80 | 2.285 | 37.4 |
| 0.30 | 0.857 | 19.3 | 0.85 | 2.428 | 38.0 |
| 0.35 | 1.000 | 22.1 | 0.90 | 2.570 | 38.5 |
| 0.40 | 1.142 | 24.7 | 0.95 | 2.713 | 38.6 |
| 0.45 | 1.285 | 27.1 | 1.00 | 2.856 | 38.3 |
| 0.50 | 1.428 | 29.3 | | | |

In the image optical lens system according to the 3rd embodiment, the definitions of f, Fno, HFOV, V1, V2, CT1, CT3, R5, R6, f2, f4, SD, TD, TTL, ImgH, CRA(Max), CRA(H), CRA(D) and CRA(V) are the same as those stated in the 1st embodiment with corresponding values for the 3rd embodiment. Moreover, these parameters can be calculated from Tables 7-9 as the following values and satisfy the following relationships:

| | | | |
|---|---|---|---|
| f(mm) | 3.55 | SD/TD | 0.95 |
| Fno | 2.70 | TTL/ImgH | 1.42 |
| HFOV (deg.) | 38.3 | CRA(Max) (deg.) | 38.6 |
| V1 − V2 | 34.5 | CRA(H) (deg.) | 37.4 |
| CT3/CT1 | 2.09 | CRA(Max) − CRA(H) (deg.) | 1.2 |
| (R5 + R6)/(R5 − R6) | 2.76 | CRA(D) (deg.) | 38.3 |
| f/f2 | −0.55 | CRA(V) deg.) | 32.9 |
| f4/f | −0.60 | | |

4th Embodiment

Figure 10:
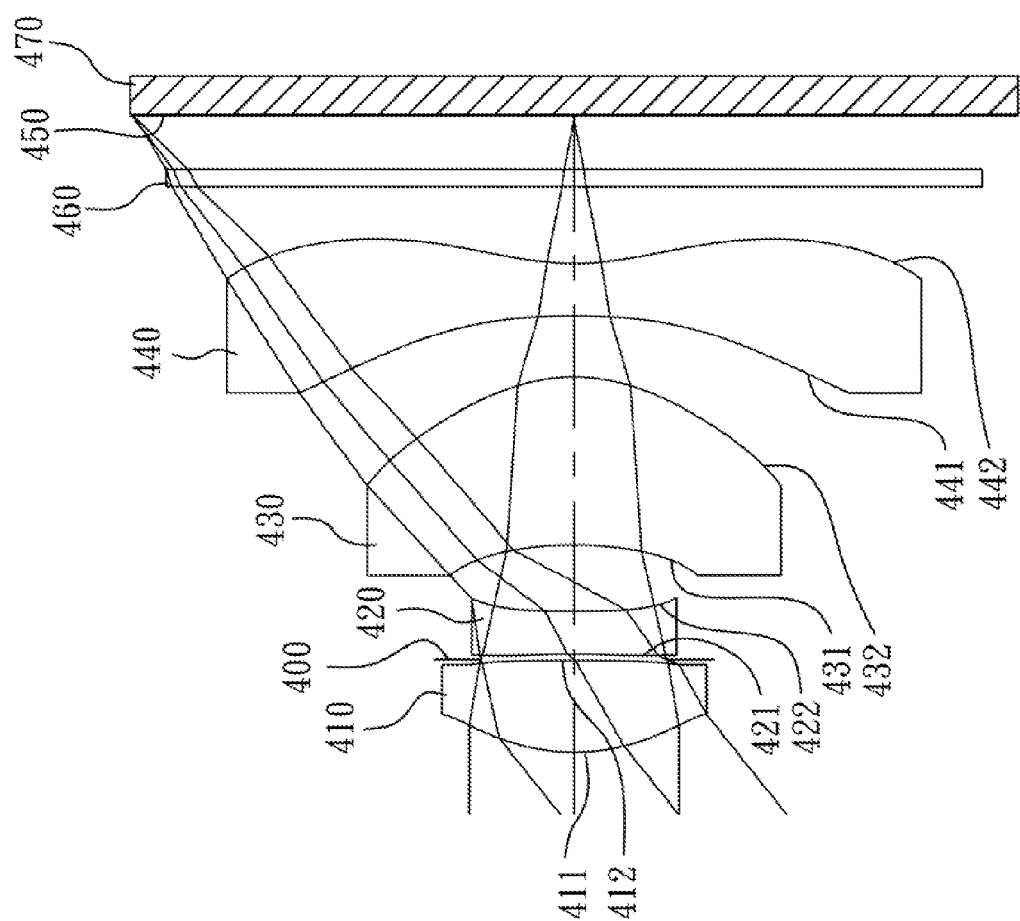
FIG. 10 is a schematic view of an image optical lens system according to the 4th embodiment of the present disclosure.
Figure 11:
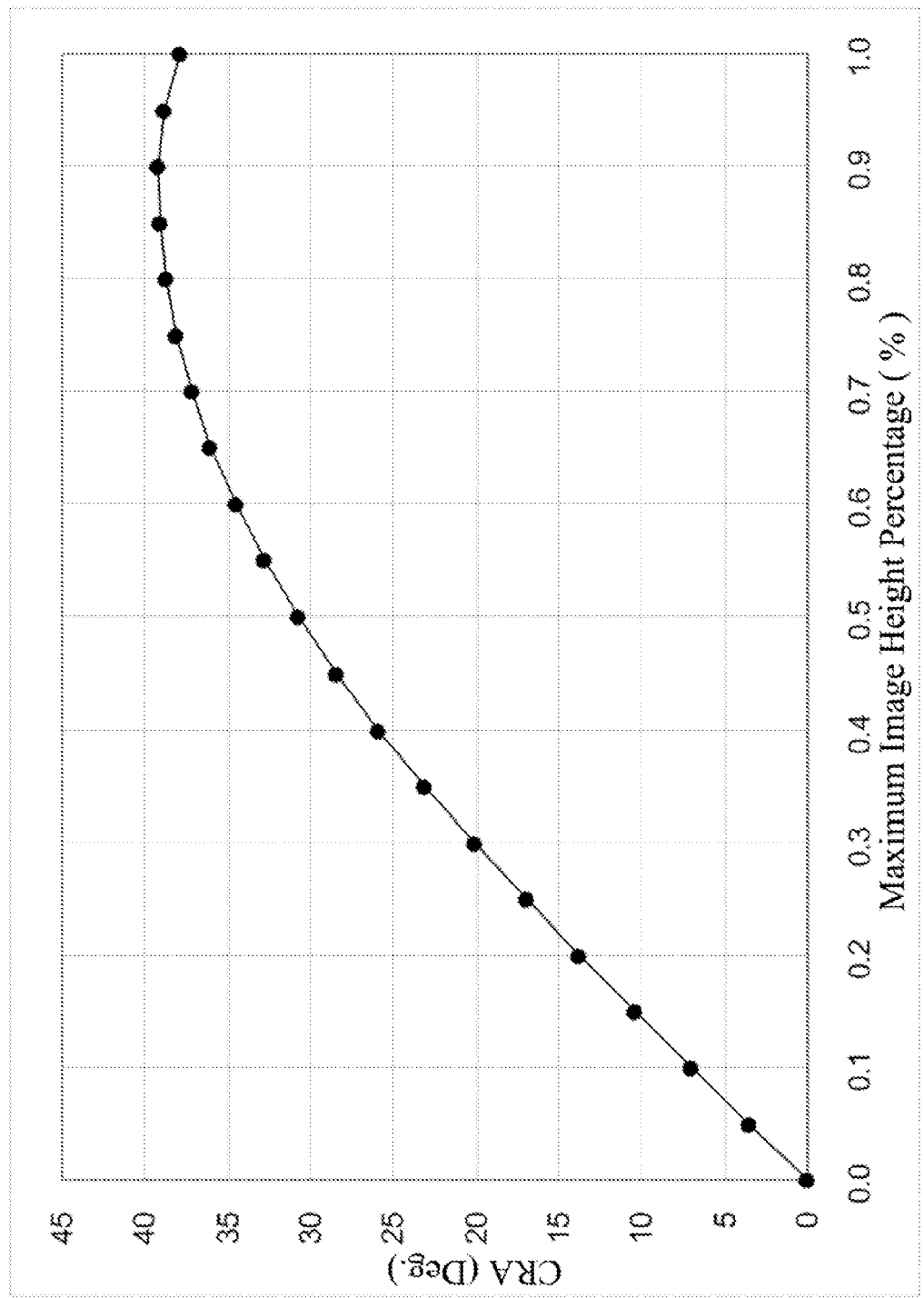
FIG. 11 is a relationship diagram of the CRA (y-axial) and the maximum image height percentage (x-axial) of the image optical lens system according to the 4th embodiment.
Figure 12:
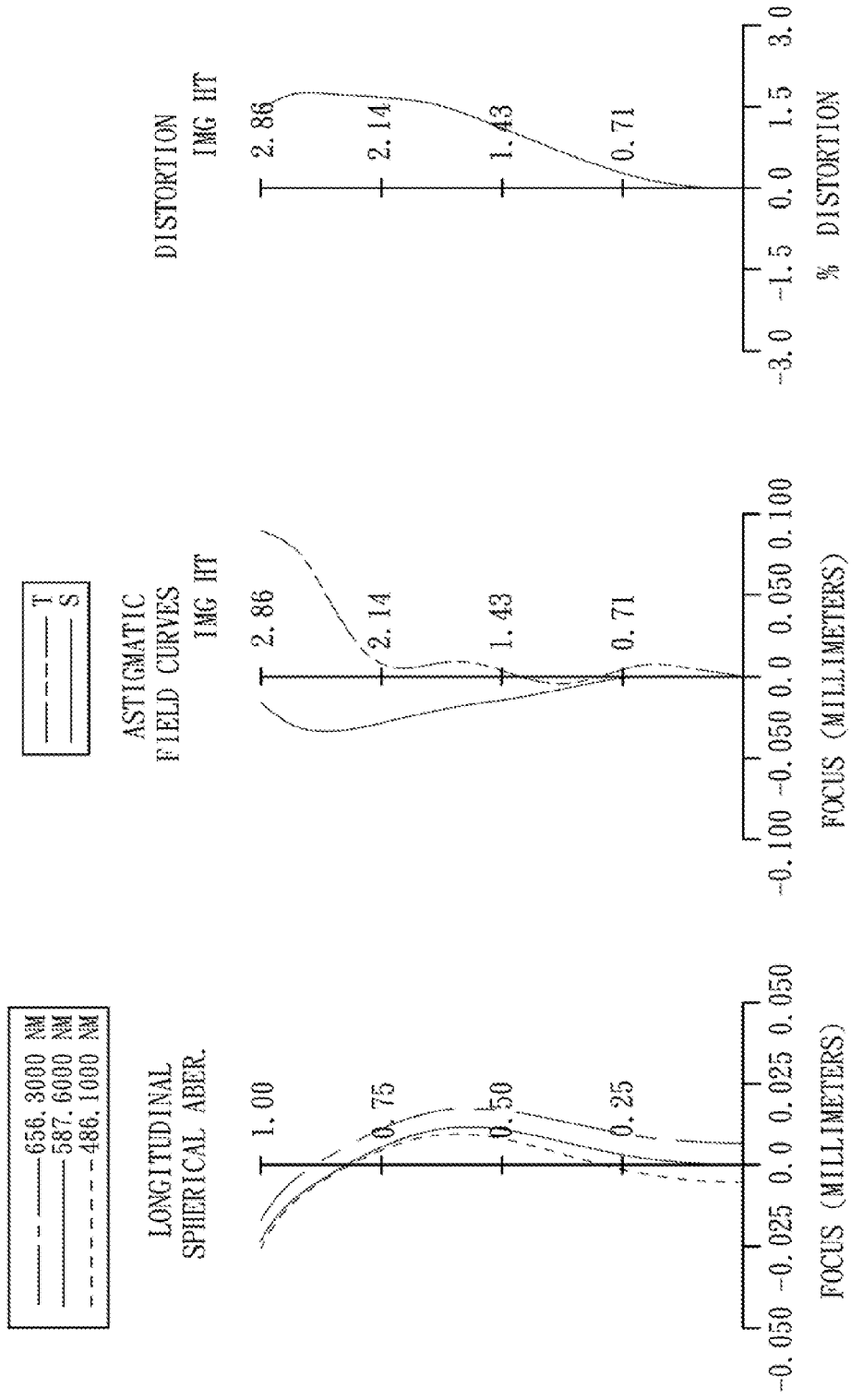
FIG. 12 shows spherical aberration curves, astigmatic field curves and a distortion curve of the image optical lens system according to the 4th embodiment.

FIG. 10 is a schematic view of an image optical lens system according to the 4th embodiment of the present disclosure. FIG. 11 is a relationship diagram of the CRA (y-axial) and the maximum image height percentage (x-axial) of the image optical lens system according to the 4th embodiment. FIG. 12 shows spherical aberration curves, astigmatic field curves and a distortion curve of the image optical lens system according to the 4th embodiment. In FIG. 10, the image optical lens system includes, in order from an object side to an image side, the first lens element 410, an aperture stop 400, the second lens element 420, the third lens element 430, the fourth lens element 440, an IR-filter 460, an image plane 450 and an image sensor 470.

The first lens element 410 with positive refractive power has a convex object-side surface 411 and a convex image-side surface 412, and is made of glass. The object-side surface 411 and the image-side surface 412 of the first lens element 410 are aspheric.

The second lens element 420 with negative refractive power has a concave object-side surface 421 and a concave image-side surface 422, and is made of plastic material. The object-side surface 421 and the image-side surface 422 of the second lens element 420 are aspheric.

The third lens element 430 with positive refractive power has a concave object-side surface 431 and a convex image-side surface 432, and is made of plastic material. The object-side surface 431 and the image-side surface 432 of the third lens element 430 are aspheric.

The fourth lens element 440 with negative refractive power has a concave object-side surface 441 and a concave image-side surface 442, and the image-side surface 442 of the fourth lens element 440 changes from concave at the paraxial region to convex at the peripheral region. The fourth lens element 440 is made of plastic material, and the object-side surface 441 and the image-side surface 442 thereof are aspheric.

The IR-filter 460 is made of glass and located between the fourth lens element 440 and the image plane 450, and will not affect the focal length of the image optical lens system.

In the image optical lens system according to the 4th embodiment, the pixel size of the image sensor 470 is 1.4 um, wherein the horizontal direction of the image sensor 470 is 3264 pixels, and the vertical direction of the image sensor 470 is 2448 pixels.

The detailed optical data of the 4th embodiment are shown in Table 10, the aspheric surface data are shown in Table 11, and the maximum image height percentage are shown in Table 12 below.

TABLE 10

4th Embodiment
f = 3.51 mm, Fno = 2.60, HFOV = 38.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.308560 (ASP) | 0.595 | Glass | 1.566 | 61.1 | 2.22 |
| 2 | | −25.910500 (ASP) | 0.007 | | | | |
| 3 | Ape. Stop | Plano | 0.035 | | | | |
| 4 | Lens 2 | −5.379800 (ASP) | 0.273 | Plastic | 1.650 | 21.4 | −5.68 |
| 5 | | 11.960000 (ASP) | 0.432 | | | | |
| 6 | Lens 3 | −2.342140 (ASP) | 1.081 | Plastic | 1.544 | 55.9 | 2.90 |
| 7 | | −1.097180 (ASP) | 0.397 | | | | |
| 8 | Lens 4 | −4.448700 (ASP) | 0.333 | Plastic | 1.544 | 55.9 | −2.08 |
| 9 | | 1.558720 (ASP) | 0.500 | | | | |
| 10 | IR-Filter | Plano | 0.110 | Glass | 1.517 | 64.2 | — |
| 11 | | Plano | 0.350 | | | | |
| 12 | Image | Plano | — | | | | |

Note:
Reference wavelength (d-line) is 587.6 nm.

TABLE 11

Aspheric Coefficients

| Surface # | 1 | 2 | 4 | 5 |
|---|---|---|---|---|
| k = | −6.18534E−01 | 1.00000E+00 | −5.00000E+01 | 5.00000E+01 |
| A4 = | 9.84120E−03 | −4.91295E−02 | 1.90546E−01 | 3.29033E−01 |
| A6 = | −6.29738E−02 | −2.37947E−02 | −5.45965E−03 | −8.63707E−02 |
| A8 = | 8.79599E−02 | −1.67767E−01 | −1.12587E−01 | 2.86600E−01 |
| A10 = | −2.44312E−01 | 8.43736E−02 | 2.38133E−01 | |
| A12 = | | | 5.46028E−02 | |

| Surface # | 6 | 7 | 8 | 9 |
|---|---|---|---|---|
| k = | 3.22863E+00 | −4.58661E+00 | 1.59537E+00 | −1.13562E+01 |
| A4 = | −1.60780E−02 | −1.47442E−01 | −7.22113E−02 | −7.37793E−02 |
| A6 = | −2.77880E−02 | 1.10697E−01 | 3.04849E−02 | 2.93470E−02 |
| A8 = | −7.21340E−02 | −4.06843E−02 | −1.83330E−03 | −8.53251E−03 |
| A10 = | −2.71415E−01 | −1.34492E−02 | −5.23816E−04 | 1.31579E−03 |
| A12 = | 4.17283E−01 | 9.75578E−03 | −1.20641E−04 | −2.91718E−05 |
| A14 = | −1.29146E−01 | 1.88754E−03 | 4.45191E−05 | −1.88008E−05 |
| A16 = | −3.36372E−01 | −1.65908E−03 | −1.52191E−06 | 1.70109E−06 |

TABLE 12

| Maximum Image Height Percentage (%) | Image Height (mm) | CRA (Deg.) | Maximum Image Height Percentage (%) | Image Height (mm) | CRA (Deg.) |
|---|---|---|---|---|---|
| 0.00 | 0.000 | 0.0 | 0.55 | 1.571 | 32.8 |
| 0.05 | 0.143 | 3.5 | 0.60 | 1.714 | 34.5 |
| 0.10 | 0.286 | 7.0 | 0.65 | 1.856 | 36.0 |
| 0.15 | 0.428 | 10.4 | 0.70 | 1.999 | 37.2 |
| 0.20 | 0.571 | 13.7 | 0.75 | 2.142 | 38.1 |
| 0.25 | 0.714 | 17.0 | 0.80 | 2.285 | 38.7 |
| 0.30 | 0.857 | 20.1 | 0.85 | 2.428 | 39.1 |
| 0.35 | 1.000 | 23.1 | 0.90 | 2.570 | 39.2 |
| 0.40 | 1.142 | 25.8 | 0.95 | 2.713 | 38.8 |
| 0.45 | 1.285 | 28.4 | 1.00 | 2.856 | 37.8 |
| 0.50 | 1.428 | 30.7 | | | |

In the image optical lens system according to the 4th embodiment, the definitions of f, Fno, HFOV, V1, V2, CT1, CT3, R5, R6, f2, f4, SD, TD, TTL, ImgH, CRA(Max), CRA(H), CRA(D) and CRA(V) are the same as those stated in the 1st embodiment with corresponding values for the 4th embodiment. Moreover, these parameters can be calculated from Tables 10-12 as the following values and satisfy the following relationships:

| | | | |
|---|---|---|---|
| f(mm) | 3.51 | SD/TD | 0.81 |
| Fno | 2.60 | TTL/ImgH | 1.43 |
| HFOV (deg.) | 38.7 | CRA(Max) (deg.) | 39.2 |
| V1 − V2 | 39.7 | CRA(H) (deg.) | 38.7 |
| CT3/CT1 | 1.82 | CRA(Max) − CRA(H) (deg.) | 0.5 |
| (R5 + R6)/(R5 − R6) | 2.76 | CRA(D) (deg.) | 37.8 |
| f/f2 | −0.62 | CRA(V) (deg.) | 34.5 |
| f4/f | −0.59 | | |

5th Embodiment

Figure 13:
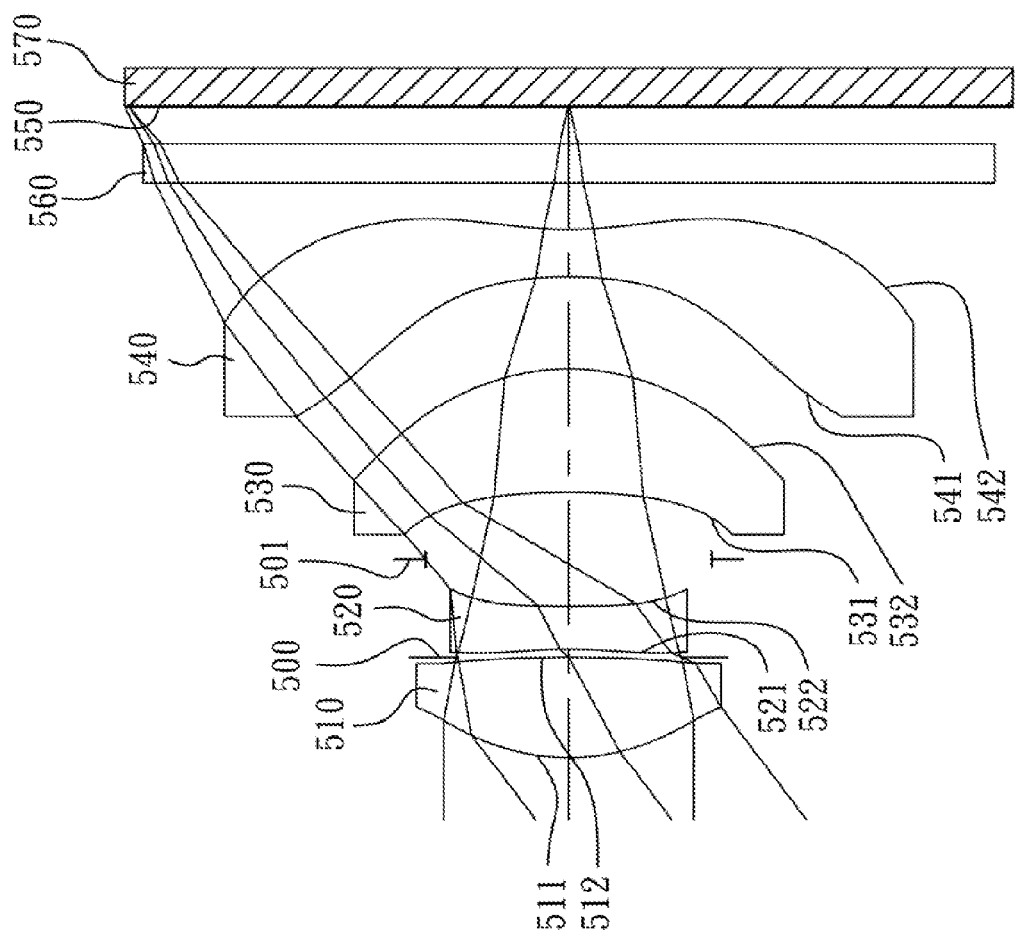
FIG. 13 is a schematic view of an image optical lens system according to the 5th embodiment of the present disclosure.
Figure 14:
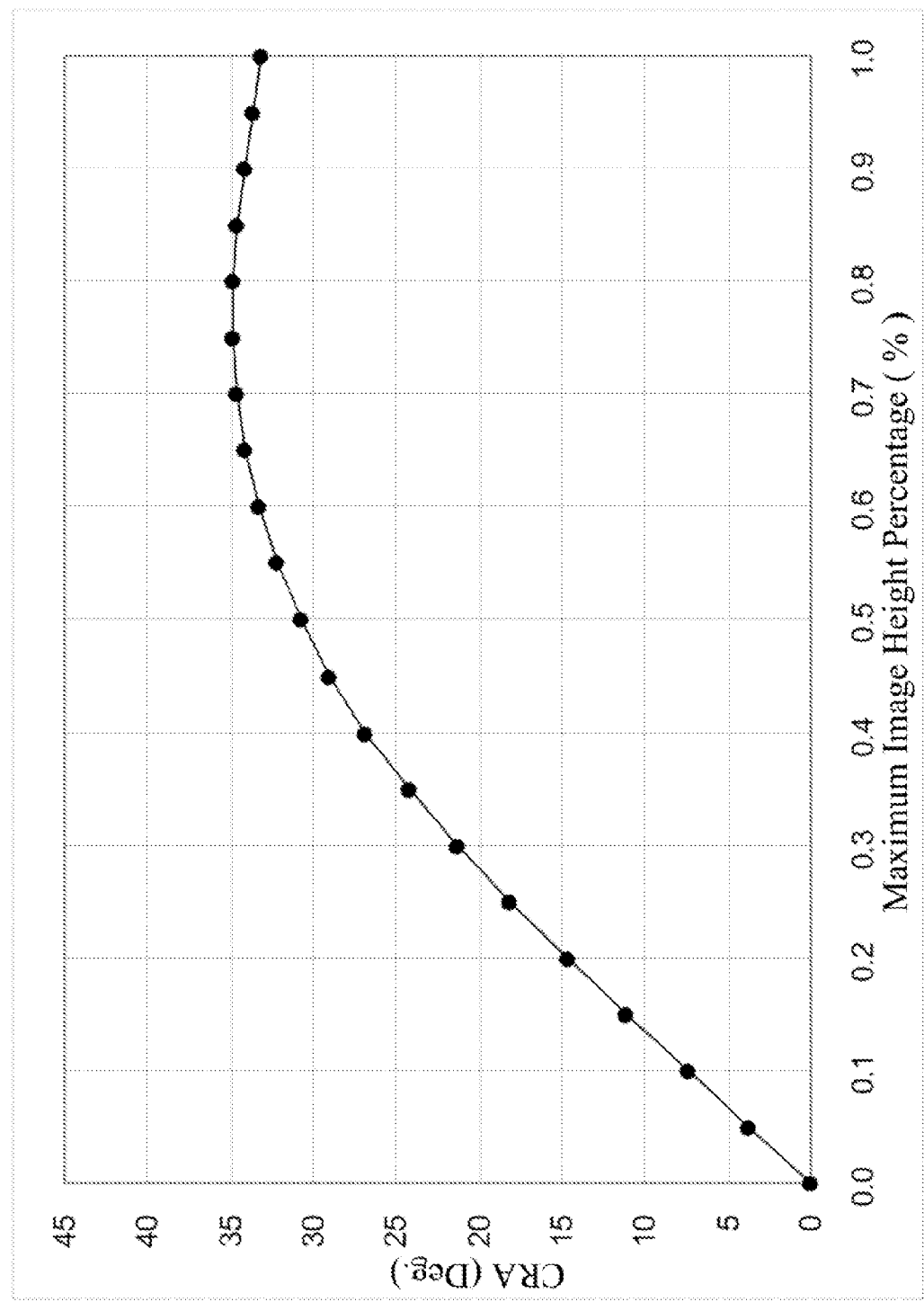
FIG. 14 is a relationship diagram of the CRA (y-axial) and the maximum image height percentage (x-axial) of the image optical lens system according to the 5th embodiment.
Figure 15:
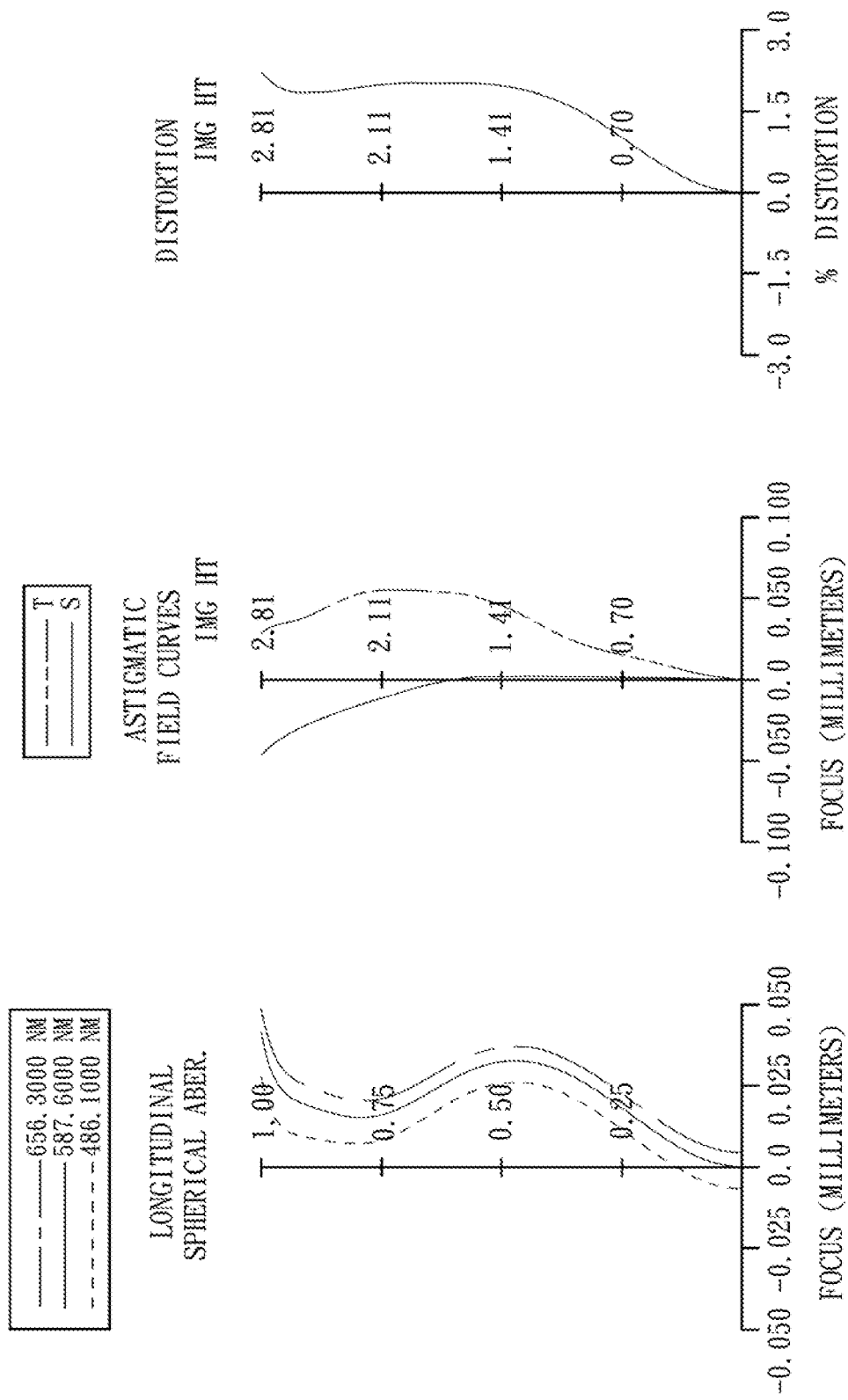
FIG. 15 shows spherical aberration curves, astigmatic field curves and a distortion curve of the image optical lens system according to the 5th embodiment.

FIG. 13 is a schematic view of an image optical lens system according to the 5th embodiment of the present disclosure. FIG. 14 is a relationship diagram of the CRA (y-axial) and the maximum image height percentage (x-axial) of the image optical lens system according to the 5th embodiment. FIG. 15 shows spherical aberration curves, astigmatic field curves and a distortion curve of the image optical lens system according to the 5th embodiment. In FIG. 13, the image optical lens system includes, in order from an object side to an image side, the first lens element 510, an aperture stop 500, the second lens element 520, a stop 501, the third lens element 530, the fourth lens element 540, an IR-filter 560, an image plane 550 and an image sensor 570.

The first lens element 510 with positive refractive power has a convex is object-side surface 511 and a convex image-side surface 512, and is made of plastic material. The object-side surface 511 and the image-side surface 512 of the first lens element 510 are aspheric.

The second lens element 520 with negative refractive power has a concave object-side surface 521 and a concave image-side surface 522, and is made of plastic material. The object-side surface 521 and the image-side surface 522 of the second lens element 520 are aspheric.

The third lens element 530 with positive refractive power has a concave object-side surface 531 and a convex image-side surface 532, and is made of plastic material. The object-side surface 531 and the image-side surface 532 of the third lens element 530 are aspheric.

The fourth lens element 540 with negative refractive power has a concave object-side surface 541 and a concave image-side surface 542, and the image-side surface 542 of the fourth lens element 540 changes from concave at the paraxial region to convex at the peripheral region. The fourth lens element 540 is made of plastic material, and the object-side surface 541 and the image-side surface 542 thereof are aspheric.

The IR-filter 560 is made of glass and located between the fourth lens element 540 and the image plane 550, and will not affect the focal length of the image optical lens system.

In the image optical lens system according to the 5th embodiment, the pixel size of the image sensor 570 is 1.12 um, wherein the horizontal direction of the image sensor 570 is 4016 pixels, and the vertical direction of the image sensor 570 is 3016 pixels.

The detailed optical data of the 5th embodiment are shown in Table 13, the aspheric surface data are shown in Table 14, and the maximum image height percentage are shown in Table 15 below.

TABLE 13

5th Embodiment
f = 3.62 mm, Fno = 2.27, HFOV = 37.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.387940 (ASP) | 0.640 | Plastic | 1.544 | 55.9 | 2.19 |
| 2 | | −6.996600 (ASP) | 0.000 | | | | |
| 3 | Ape. Stop | Plano | 0.050 | | | | |
| 4 | Lens 2 | −3.280500 (ASP) | 0.280 | Plastic | 1.640 | 23.3 | −4.26 |
| 5 | | 16.588700 (ASP) | 0.296 | | | | |
| 6 | Stop | Plano | 0.434 | | | | |
| 7 | Lens 3 | −4.198400 (ASP) | 0.790 | Plastic | 1.544 | 55.9 | 3.79 |
| 8 | | −1.475870 (ASP) | 0.589 | | | | |
| 9 | Lens 4 | −2.893910 (ASP) | 0.300 | Plastic | 1.544 | 55.9 | −2.31 |
| 10 | | 2.309050 (ASP) | 0.300 | | | | |
| 11 | IR-Filter | Plano | 0.250 | Glass | 1.517 | 64.2 | — |
| 12 | | Plano | 0.238 | | | | |
| 13 | Image | Plano | — | | | | |

Note:
Reference wavelength (d-line) is 587.6 nm.
Effective radius of Surface 6 is 0.915 mm.

TABLE 14

Aspheric Coefficients

| Surface # | 1 | 2 | 4 | 5 |
|---|---|---|---|---|
| k = | −6.52331E+00 | −1.58295E+01 | 0.00000E+00 | −9.03589E+00 |
| A4 = | 2.72518E−01 | 7.43611E−02 | 3.22887E−01 | 3.09443E−01 |
| A6 = | −2.66822E−01 | −1.23931E−01 | −4.32594E−01 | −2.42859E−01 |
| A8 = | 2.20492E−01 | −3.32598E−02 | 1.09093E+00 | 4.24242E−01 |
| A10 = | −1.46094E−01 | 4.20888E−01 | −2.37568E+00 | −2.00770E−01 |
| A12 = | −4.24150E−03 | −7.10684E−01 | 3.31554E+00 | −1.76075E−01 |
| A14 = | 9.02792E−03 | 3.64494E−01 | −1.94668E+00 | 2.88966E−01 |
| A16 = | 3.27407E−11 | 8.91393E−12 | −9.28251E−12 | 4.50602E−12 |

| Surface # | 7 | 8 | 9 | 10 |
|---|---|---|---|---|
| k = | −9.62813E−01 | −6.90848E+00 | 1.57381E−01 | −1.56699E+01 |
| A4 = | −3.91769E−02 | −2.02521E−01 | −2.06699E−01 | −1.21208E−01 |
| A6 = | −6.58919E−02 | 1.59821E−01 | 8.00396E−02 | 5.35518E−02 |
| A8 = | −1.11138E−02 | −1.48485E−01 | 7.62068E−04 | −1.77558E−02 |
| A10 = | 6.75164E−02 | 8.18182E−02 | −5.48009E−03 | 3.81609E−03 |
| A12 = | −6.05388E−02 | −2.00601E−02 | 1.15976E−03 | −4.97450E−04 |
| A14 = | 1.91192E−03 | 1.06233E−03 | −8.14390E−05 | 2.79804E−05 |
| A16 = | 7.04684E−11 | 2.51624E−04 | | |

TABLE 15

| Maximum Image Height Percentage (%) | Image Height (mm) | CRA (Deg.) | Maximum Image Height Percentage (%) | Image Height (mm) | CRA (Deg.) |
|---|---|---|---|---|---|
| 0.00 | 0.000 | 0.0 | 0.55 | 1.547 | 32.2 |
| 0.05 | 0.141 | 3.7 | 0.60 | 1.688 | 33.3 |
| 0.10 | 0.281 | 7.4 | 0.65 | 1.828 | 34.1 |
| 0.15 | 0.422 | 11.1 | 0.70 | 1.969 | 34.6 |
| 0.20 | 0.563 | 14.7 | 0.75 | 2.109 | 34.9 |
| 0.25 | 0.703 | 18.1 | 0.80 | 2.250 | 34.9 |
| 0.30 | 0.844 | 21.3 | 0.85 | 2.391 | 34.6 |
| 0.35 | 0.984 | 24.3 | 0.90 | 2.531 | 34.1 |
| 0.40 | 1.125 | 26.8 | 0.95 | 2.672 | 33.6 |
| 0.45 | 1.266 | 29.0 | 1.00 | 2.813 | 33.2 |
| 0.50 | 1.406 | 30.8 | | | |

In the image optical lens system according to the 5th embodiment, the definitions of f, Fno, HFOV, V1, V2, CT1 CT3, R5, R6, f2, f4, SD, TD, TTL, ImgH, CRA(Max), CRA (H), CRA(D) and CRA(V) are the same as those stated in the 1st embodiment with corresponding values for the 5th embodiment. Moreover, these parameters can be calculated from Tables 13-15 as the following values and satisfy the following relationships:

| | | | |
|---|---|---|---|
| f (mm) | 3.62 | SD/TD | 0.81 |
| Fno | 2.27 | TTL/ImgH | 1.45 |
| HFOV (deg.) | 37.1 | CRA(Max) (deg.) | 34.9 |
| V1 − V2 | 32.6 | CRA(H) (deg.) | 34.9 |
| CT3/CT1 | 1.23 | CRA(Max) − CRA(H) (deg.) | 0.0 |
| (R5 + R6)/(R5 − R6) | 2.08 | CRA(D) (deg.) | 33.2 |
| f/f2 | −0.85 | CRA(V) (deg.) | 33.3 |
| f4/f | −0.64 | | |

6th Embodiment

Figure 16:
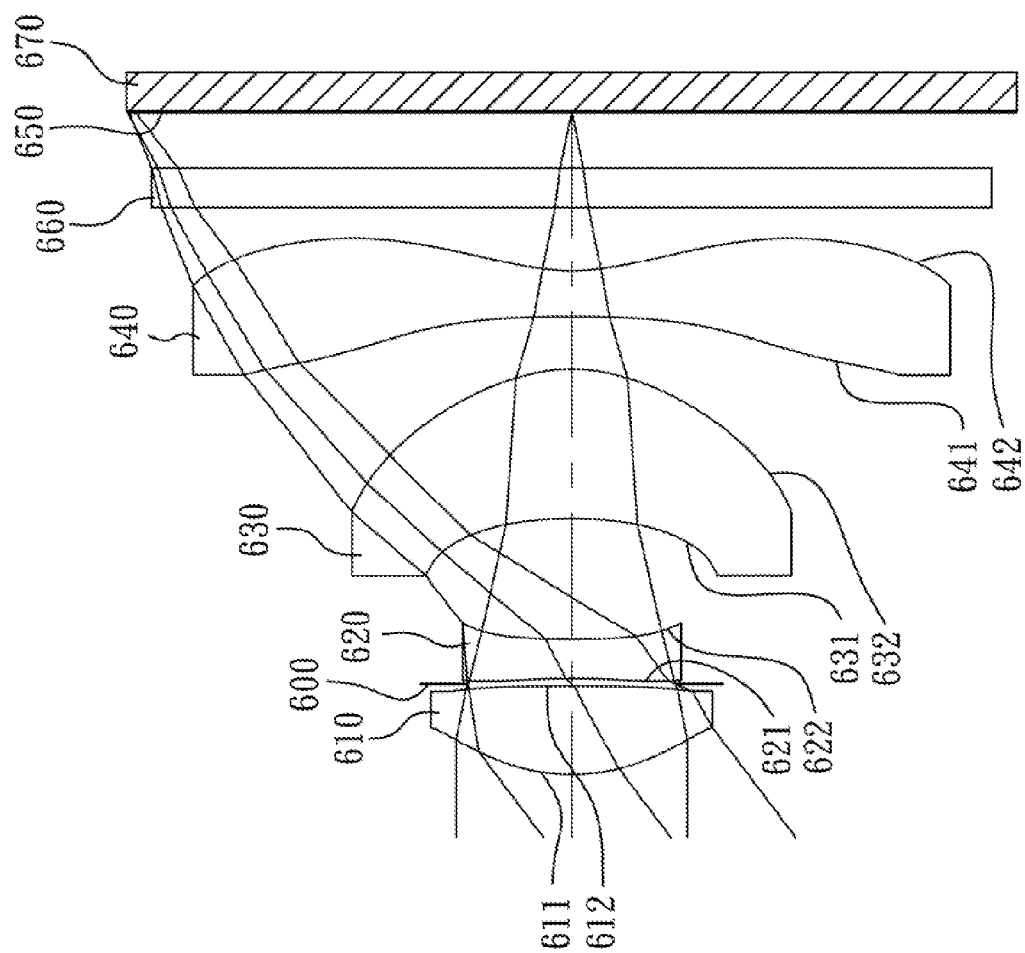
FIG. 16 is a schematic view of an image optical lens system according to the 6th embodiment of the present disclosure.
Figure 17:
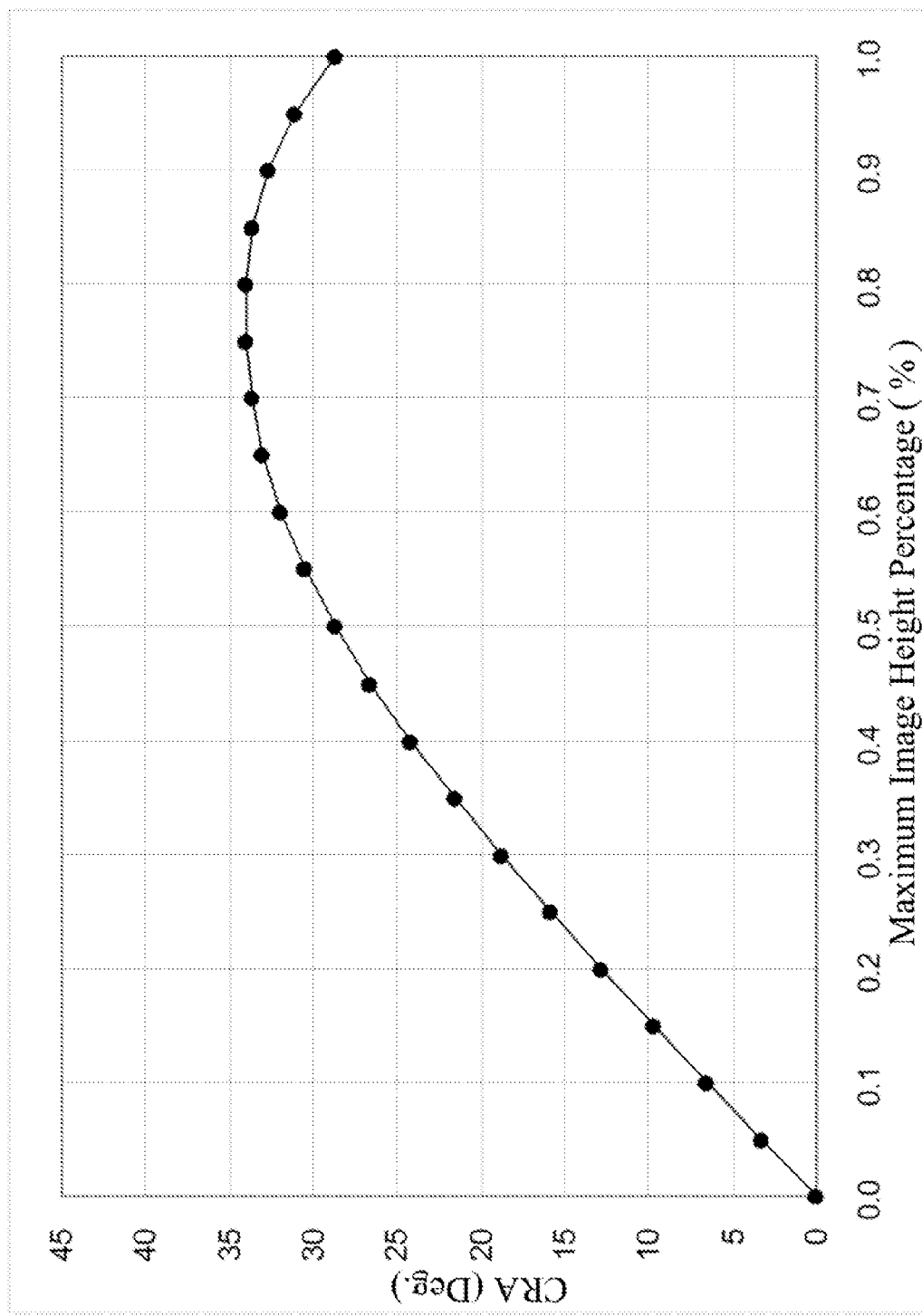
FIG. 17 is a relationship diagram of the CRA (y-axial) and the maximum image height percentage (x-axial) of the image optical lens system according to the 6th embodiment.
Figure 18:
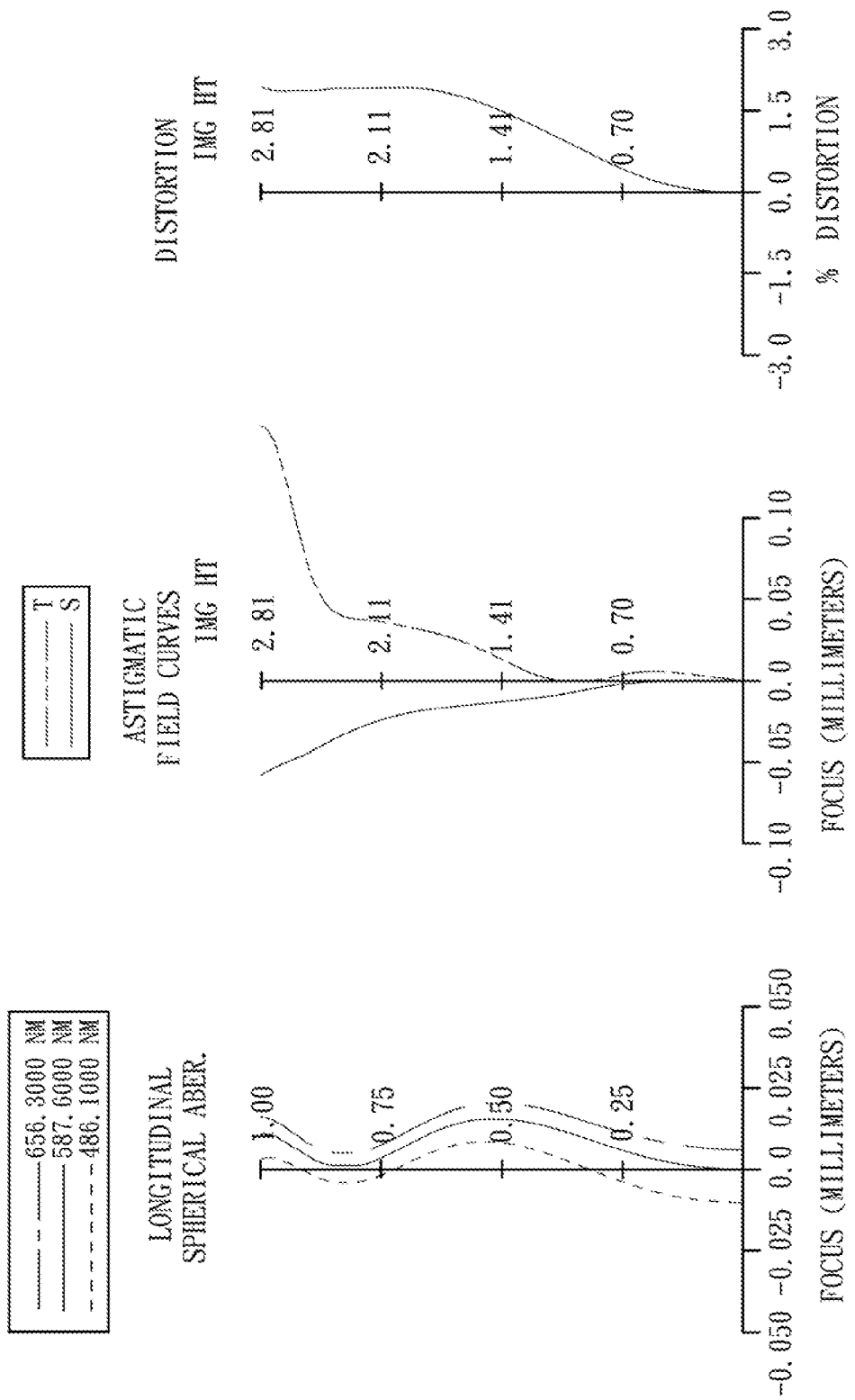
FIG. 18 shows spherical aberration curves, astigmatic field curves and a distortion curve of the image optical lens system according to the 6th embodiment.

FIG. 16 is a schematic view of an image optical lens system according to the 6th embodiment of the present disclosure. FIG. 17 is a relationship diagram of the CRA (y-axial) and the maximum image height percentage (x-axial) of the image optical lens system according to the 6th embodiment. FIG. 18 shows spherical aberration curves, astigmatic field curves and a distortion curve of the image optical lens system according to the 6th embodiment. In FIG. 16, the image optical lens system includes, in order from an object side to an image side, the first lens element 610, an aperture stop 600, the second lens element 620, the third lens element 630, the fourth lens element 640, an IR-filter 660, an image plane 650 and an image sensor 670.

The first lens element 610 with positive refractive power has a convex object-side surface 611 and a convex image-side surface 612, and is made of plastic material. The object-side surface 611 and the image-side surface 612 of the first lens element 610 are aspheric.

The second lens element 620 with negative refractive power has a concave object-side surface 621 and a concave image-side surface 622, and is made of plastic material. The object-side surface 621 and the image-side surface 622 of the second lens element 620 are aspheric.

The third lens element 630 with positive refractive power has a concave object-side surface 631 and a convex image-side surface 632, and is made of plastic material. The object-side surface 631 and the image-side surface 632 of the third lens element 630 are aspheric.

The fourth lens element 640 with negative refractive power has a concave object-side surface 641 and a concave image-side surface 642 and the image-side surface 642 of the fourth lens element 640 changes from concave at the paraxial region to convex at the peripheral region. The fourth lens element 640 is made of plastic material, and the object-side surface 641 and the image-side surface 642 thereof are aspheric.

The IR-filter 660 is made of glass and located between the fourth lens element 640 and the image plane 650, and will not affect the focal length of the image optical lens system.

In the image optical lens system according to the 6th embodiment, the pixel size of the image sensor 670 is 1.12 um, wherein the horizontal direction of the image sensor 670 is 4016 pixels, and the vertical direction of the image sensor 670 is 3016 pixels.

The detailed optical data of the 6th embodiment are shown in Table 16, the aspheric surface data are shown in Table 17, and the maximum image height percentage are shown in Table 18 below.

TABLE 16

6th Embodiment
f = 3.66 mm, Fno = 2.50, HFOV = 37.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.247110 (ASP) | 0.559 | Plastic | 1.544 | 55.9 | 2.18 |
| 2 | | −20.120700 (ASP) | 0.013 | | | | |
| 3 | Ape. Stop | Plano | 0.035 | | | | |
| 4 | Lens 2 | −4.363700 (ASP) | 0.251 | Plastic | 1.640 | 23.3 | −4.81 |
| 5 | | 9.282000 (ASP) | 0.763 | | | | |

TABLE 16-continued

6th Embodiment
f = 3.66 mm, Fno = 2.50, HFOV = 37.0 deg.

| Surface # | | Curvature Radius | Thickness | Material | Index | Abbe # | Focal length |
|---|---|---|---|---|---|---|---|
| 6 | Lens 3 | −2.370150 (ASP) | 0.949 | Plastic | 1.544 | 55.9 | 2.73 |
| 7 | | −1.040940 (ASP) | 0.330 | | | | |
| 8 | Lens 4 | −9.599200 (ASP) | 0.290 | Plastic | 1.544 | 55.9 | −2.10 |
| 9 | | 1.309010 (ASP) | 0.400 | | | | |
| 10 | IR-Filter | Plano | 0.250 | Glass | 1.517 | 64.2 | — |
| 11 | | Plano | 0.356 | | | | |
| 12 | Image | Plano | — | | | | |

Note:
Reference wavelength (d-line) is 587.6 nm.

TABLE 17

Aspheric Coefficients

| Surface # | 1 | 2 | 4 | 5 |
|---|---|---|---|---|
| k = | −4.76142E−01 | −3.92342E+01 | −4.23807E+01 | 1.39461E+02 |
| A4 = | 1.78390E−02 | −3.41034E−02 | 1.53460E−01 | 3.05461E−01 |
| A6 = | −3.75378E−02 | 2.01865E−02 | −9.75772E−03 | −1.69222E−01 |
| A8 = | 9.41436E−02 | −1.19830E−01 | −5.86636E−02 | 2.80911E−01 |
| A10 = | −2.34120E−01 | 4.01208E−02 | 1.80270E−01 | |
| A12 = | | | 4.56526E−02 | |

| Surface # | 6 | 7 | 8 | 9 |
|---|---|---|---|---|
| k = | 5.28307E+00 | −4.37741E+00 | 1.65131E+01 | −8.93556E+00 |
| A4 = | −1.87796E−02 | −1.31640E−01 | −7.13285E−02 | −6.92405E−02 |
| A6 = | −2.41546E−02 | 7.51375E−02 | 2.71388E−02 | 2.51610E−02 |
| A8 = | −2.51894E−02 | −3.52012E−02 | −1.19078E−02 | −6.78298E−03 |
| A10 = | −1.49934E−01 | −7.78782E−03 | −3.52735E−04 | 9.68004E−04 |
| A12 = | 2.94982E−01 | 8.45028E−03 | −8.15840E−05 | −1.62474E−05 |
| A14 = | −1.21220E−02 | 1.64519E−03 | 2.54454E−05 | −1.15174E−05 |
| A16 = | −2.54436E−01 | −1.82607E−03 | −1.22422E−06 | 8.50443E−07 |

TABLE 18

| Maximum Image Height Percentage (%) | Image Height (mm) | CRA (Deg.) | Maximum Image Height Percentage (%) | Image Height (mm) | CRA (Deg.) |
|---|---|---|---|---|---|
| 0.00 | 0.000 | 0.0 | 0.55 | 1.547 | 30.5 |
| 0.05 | 0.141 | 3.3 | 0.60 | 1.688 | 31.9 |
| 0.10 | 0.281 | 6.5 | 0.65 | 1.828 | 33.0 |
| 0.15 | 0.422 | 9.7 | 0.70 | 1.969 | 33.7 |
| 0.20 | 0.563 | 12.8 | 0.75 | 2.109 | 34.0 |
| 0.25 | 0.703 | 15.8 | 0.80 | 2.250 | 34.0 |
| 0.30 | 0.844 | 18.8 | 0.85 | 2.391 | 33.6 |
| 0.35 | 0.984 | 21.6 | 0.90 | 2.531 | 32.7 |
| 0.40 | 1.125 | 24.2 | 0.95 | 2.672 | 31.1 |
| 0.45 | 1.266 | 26.6 | 1.00 | 2.813 | 28.6 |
| 0.50 | 1.406 | 28.7 | | | |

In the image optical lens system according to the 6th embodiment, the definitions of f, Fno, HFOV, V1, V2, CT1, CT3, R5, R6, f2, f4, SD, TD, TTL, ImgH, CRA(Max), CRA(H), CRA(D) and CRA(V) are the same as those stated in the 1st embodiment with corresponding values for the 6th embodiment. Moreover, these parameters can be calculated from Tables 16-18 as the following values and satisfy the following relationships:

| | | | |
|---|---|---|---|
| f (mm) | 3.66 | SD/TD | 0.82 |
| Fno | 2.50 | TTL/ImgH | 1.46 |
| HFOV (deg.) | 37.0 | CRA(Max) (deg.) | 34.0 |
| V1-V2 | 32.6 | CRA(H) (deg.) | 34.0 |
| CT3/CT1 | 1.70 | CRA(Max) − CRA(H) (deg.) | 0.0 |
| (R5 + R6)/(R5 − R6) | 2.57 | CRA(D) (deg.) | 28.6 |
| f/f2 | −0.79 | CRA(V) (deg.) | 31.9 |
| f4/f | −0.57 | | |

7th Embodiment

Figure 19:
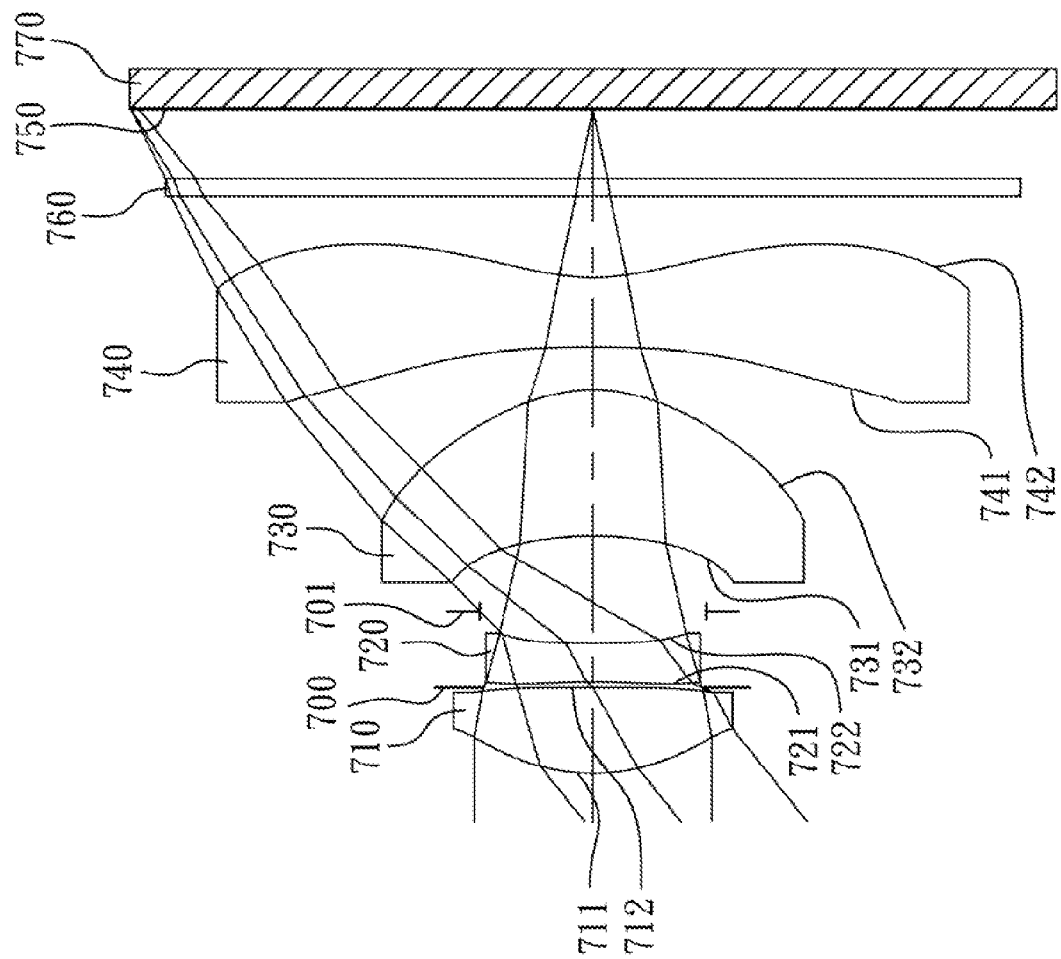
FIG. 19 is a schematic view of an image optical lens system according to the 7th embodiment of the present disclosure.
Figure 20:
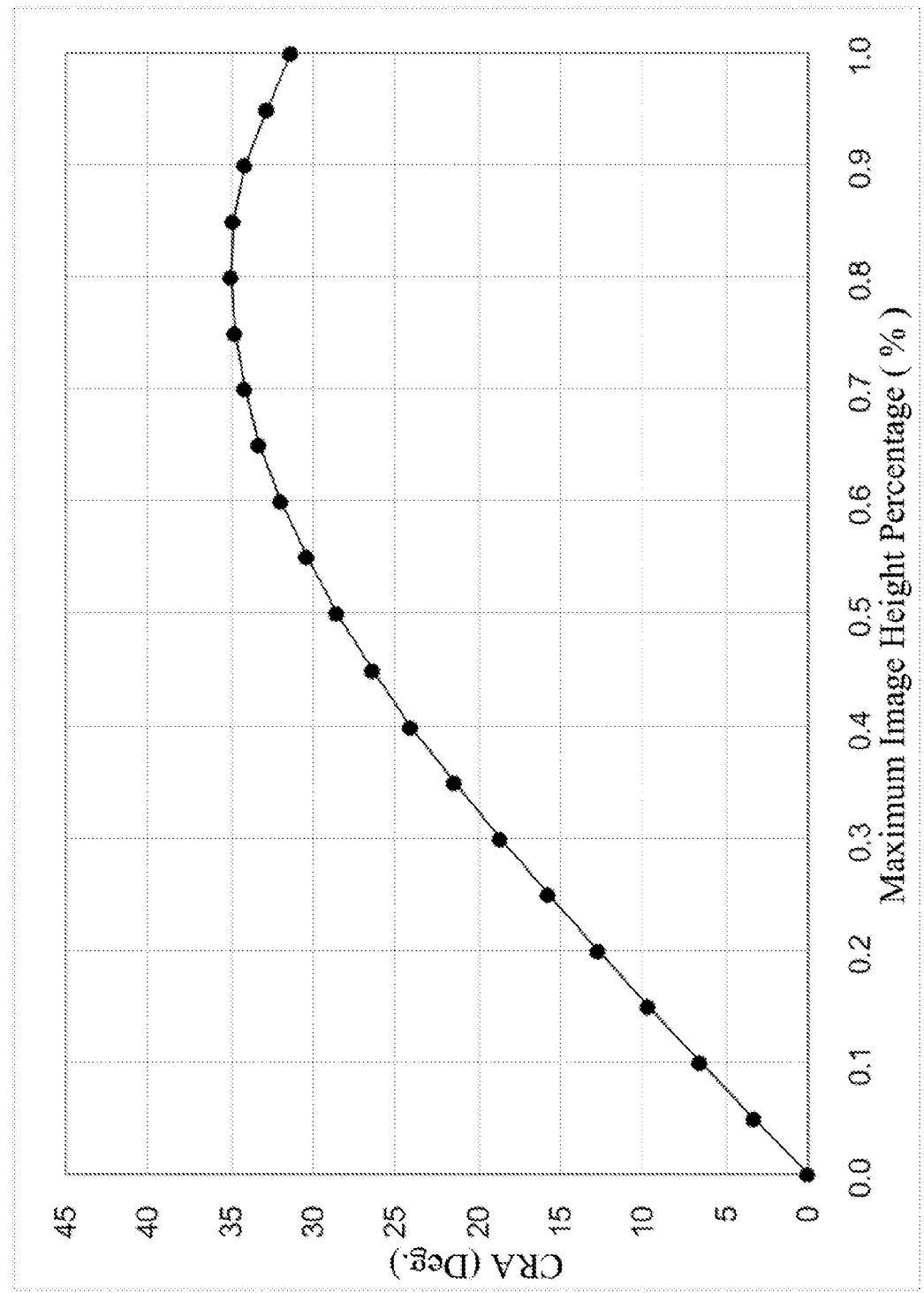
FIG. 20 is a relationship diagram of the CRA (y-axial) and the maximum image height percentage (x-axial) of the image optical lens system according to the 7th embodiment.
Figure 21:
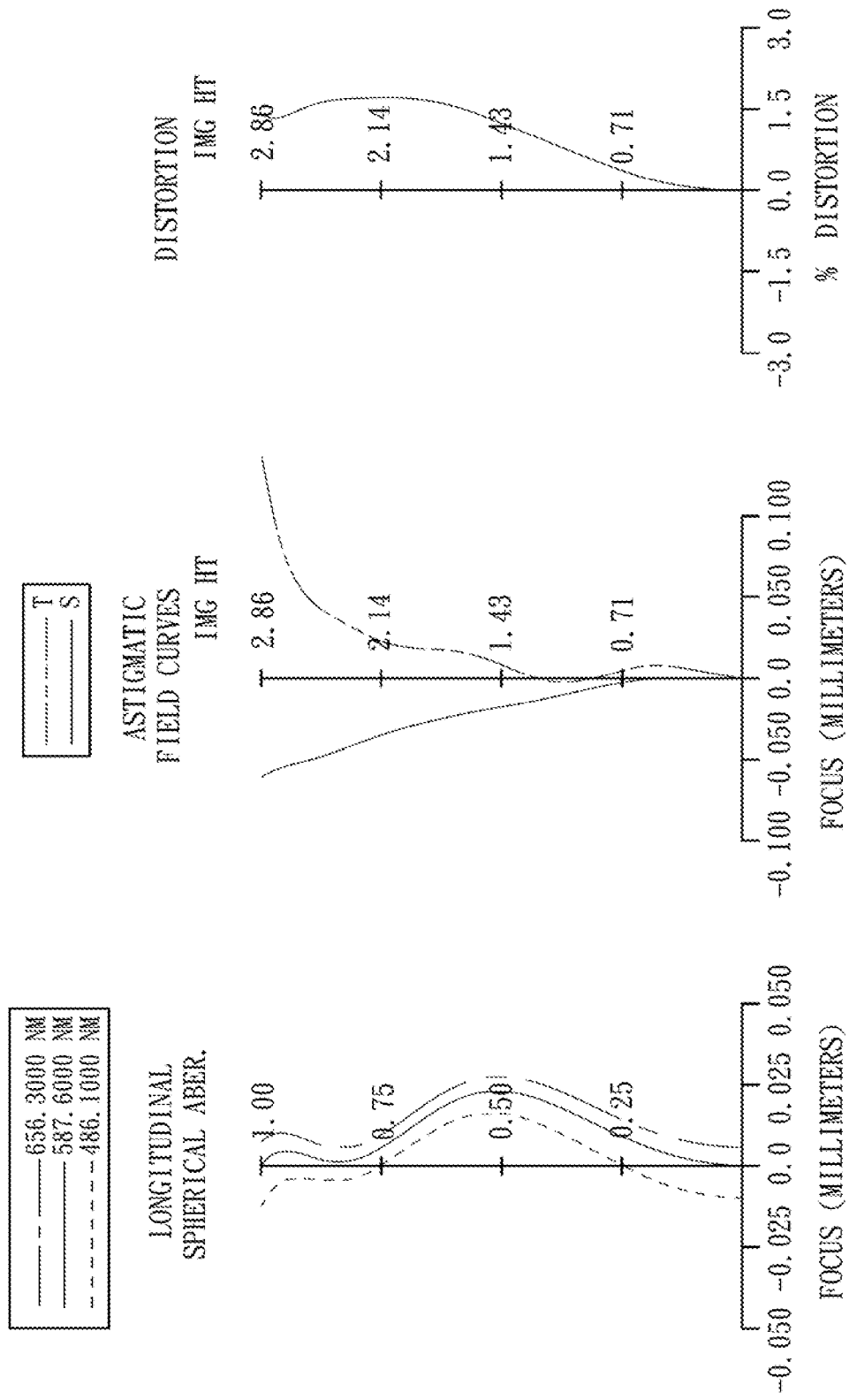
FIG. 21 shows spherical aberration curves, astigmatic field curves and a distortion curve of the image optical lens system according to the 7th embodiment.

FIG. 19 is a schematic view of an image optical lens system according to the 7th embodiment of the present disclosure. FIG. 20 is a relationship diagram of the CRA (y-axial) and the maximum image height percentage (x-axial) of the image optical lens system according to the 7th embodiment. FIG. 21 shows spherical aberration curves, astigmatic field curves and a distortion curve of the image optical lens system according to the 7th embodiment. In FIG. 19, the image optical lens system includes, in order from an object side to an image side, the first lens element 710, an aperture stop 700, the second lens element 720, a stop 701, the third lens element 730, the fourth lens element 740, an IR-filter 760, an image plane 750 and an image sensor 770.

The first lens element 710 with positive refractive power has a convex object-side surface 711 and a convex image-side surface 712, and is made of plastic material. The object-side surface 711 and the image-side surface 712 of the first lens element 710 are aspheric.

The second lens element 720 with negative refractive power has a concave object-side surface 721 and a concave image-side surface 722, and is made of plastic material. The object-side surface 721 and the image-side surface 722 of the second lens element 720 are aspheric.

The third lens element 730 with positive refractive power has a concave object-side surface 731 and a convex image-side surface 732, and is made of plastic material. The object-side surface 731 and the image-side surface 732 of the third lens element 730 are aspheric.

The fourth lens element 740 with negative refractive power has a concave object-side surface 741 and a concave image-side surface 742, and the image-side surface 742 of the fourth lens element 740 changes from concave at the paraxial region to convex at the peripheral region. The fourth lens element 740 is made of plastic material, and the object-side surface 741 and the image-side surface 742 thereof are aspheric.

The IR-filter 760 is made of glass and located between the fourth lens element 740 and the image plane 750, and will not affect the focal length of the image optical lens system.

In the image optical lens system according to the 7th embodiment, the pixel size of the image sensor 770 is 1.4 um, wherein the horizontal direction of the image sensor 770 is 3264 pixels, and the vertical direction of the image sensor 770 is 2448 pixels.

The detailed optical data of the 7th embodiment are shown in Table 19, the aspheric surface data are shown in Table 20, and the maximum image height percentage are shown in Table 21 below

TABLE 19

7th Embodiment
f = 3.52 mm, Fno = 2.40, HFOV = 38.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.220270 (ASP) | 0.530 | Plastic | 1.544 | 55.9 | 2.16 |
| 2 | | −26.303600 (ASP) | −0.001 | | | | |
| 3 | Ape. Stop | Plano | 0.035 | | | | |
| 4 | Lens 2 | −4.875000 (ASP) | 0.240 | Plastic | 1.640 | 23.3 | −4.55 |
| 5 | | 7.366900 (ASP) | 0.200 | | | | |
| 6 | Stop | Plano | 0.463 | | | | |
| 7 | Lens 3 | −2.213110 (ASP) | 0.907 | Plastic | 1.544 | 55.9 | 2.55 |
| 8 | | −0.977070 (ASP) | 0.260 | | | | |
| 9 | Lens 4 | −10.199446 (ASP) | 0.434 | Plastic | 1.544 | 55.9 | −2.09 |
| 10 | | 1.296378 (ASP) | 0.500 | | | | |
| 11 | IR-Filter | Plano | 0.110 | Glass | 1.517 | 64.2 | — |
| 12 | | Plano | 0.431 | | | | |
| 13 | Image | Plano | — | | | | |

Note:
Reference wavelength (d-line) is 587.6 nm.
Effective radius of Surface 6 is 0.700 mm.

TABLE 20

Aspheric Coefficients

| Surface # | 1 | 2 | 4 | 5 |
|---|---|---|---|---|
| k = | −5.04525E−01 | −5.00000E+01 | −4.93579E+01 | 9.12119E+01 |
| A4 = | 1.70606E−02 | −3.86387E−02 | 1.80951E−01 | 3.27984E−01 |
| A6 = | −4.18171E−02 | 1.97377E−02 | 3.54537E−03 | −1.41572E−01 |
| A8 = | 1.14426E−01 | −1.47013E−01 | −8.22598E−02 | 2.62025E−01 |
| A10 = | −3.36457E−01 | 2.16789E−02 | 2.12227E−01 | |
| A12 = | | | 5.46538E−02 | |

| Surface # | 7 | 8 | 9 | 10 |
|---|---|---|---|---|
| k = | 3.21606E+00 | −3.96445E+00 | 2.22093E+01 | −8.80037E+00 |
| A4 = | −1.90543E−02 | −1.51522E−01 | −7.22113E−02 | −7.37793E−02 |
| A6 = | −3.70935E−02 | 9.91963E−02 | 3.04849E−02 | 2.93470E−02 |
| A8 = | −3.48385E−02 | −4.58362E−02 | −1.83330E−03 | −8.53251E−03 |
| A10 = | −2.12606E−01 | −1.15653E−02 | −5.23816E−04 | 1.31579E−03 |
| A12 = | 4.31400E−01 | 1.30139E−02 | −1.20641E−04 | −2.91718E−05 |
| A14 = | −7.78707E−02 | 2.85332E−03 | 4.45191E−05 | −1.88008E−05 |
| A16 = | −4.34666E−01 | −3.55032E−03 | −1.52191E−06 | 1.70109E−06 |

TABLE 21

| Maximum Image Height Percentage (%) | Image Height (mm) | CRA (Deg.) | Maximum Image Height Percentage (%) | Image Height (mm) | CRA (Deg.) |
|---|---|---|---|---|---|
| 0.00 | 0.000 | 0.0 | 0.55 | 1.571 | 30.4 |
| 0.05 | 0.143 | 3.3 | 0.60 | 1.714 | 32.0 |
| 0.10 | 0.286 | 6.5 | 0.65 | 1.856 | 33.2 |
| 0.15 | 0.428 | 9.7 | 0.70 | 1.999 | 34.1 |
| 0.20 | 0.571 | 12.8 | 0.75 | 2.142 | 34.7 |
| 0.25 | 0.714 | 15.8 | 0.80 | 2.285 | 34.9 |
| 0.30 | 0.857 | 18.7 | 0.85 | 2.428 | 34.8 |
| 0.35 | 1.000 | 21.4 | 0.90 | 2.570 | 34.1 |
| 0.40 | 1.142 | 24.0 | 0.95 | 2.713 | 32.8 |
| 0.45 | 1.285 | 26.4 | 1.00 | 2.856 | 31.4 |
| 0.50 | 1.428 | 28.5 | | | |

In the image optical lens system according to the 7th embodiment, the definitions of f, Fno, HFOV, V1, V2, CT1 CT3, R5, R6, f2, f4, SD, TD, TTL, ImgH, CRA(Max), CRA(H), CRA(D) and CRA(V) are the same as those stated in the 1st embodiment with corresponding values for the 7th embodiment. Moreover, these parameters can be calculated from Tables 19-21 as the following values and satisfy the following relationships:

| f (mm) | 3.52 | SD/TD | 0.83 |
|---|---|---|---|
| Fno | 2.40 | TTL/ImgH | 1.43 |
| HFOV (deg.) | 38.6 | CRA(Max) (deg.) | 34.9 |
| V1-V2 | 32.6 | CRA(H) (deg.) | 34.9 |
| CT3/CT1 | 1.71 | CRA(Max) − CRA(H) (deg.) | 0.0 |
| (R5 + R6)/(R5 − R6) | 2.58 | CRA(D) (deg.) | 31.4 |
| f/f2 | −0.77 | CRA(V) (deg.) | 32.0 |
| f4/f | −0.59 | | |

8th Embodiment

Figure 22:
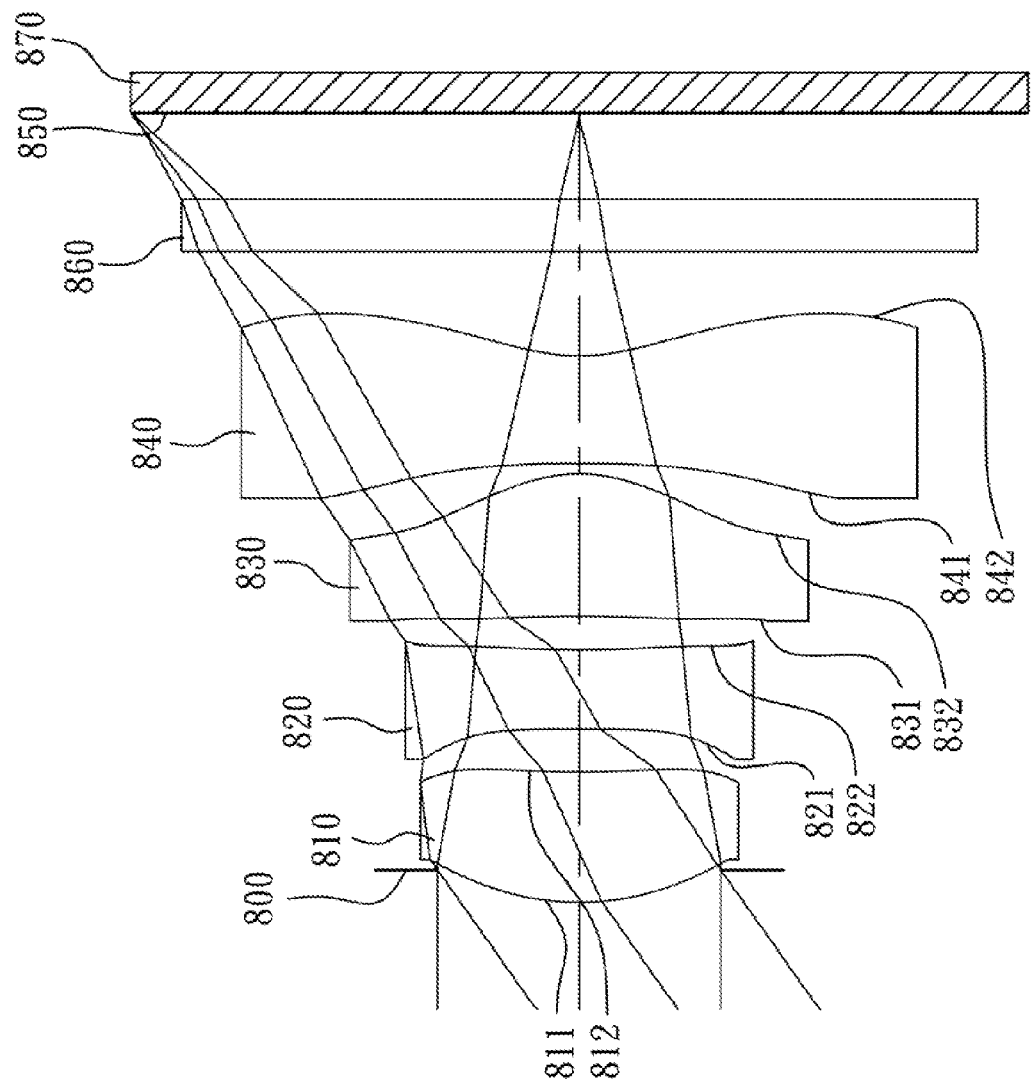
FIG. 22 is a schematic view of an image optical lens system according to the 8th embodiment of the present disclosure.
Figure 23:
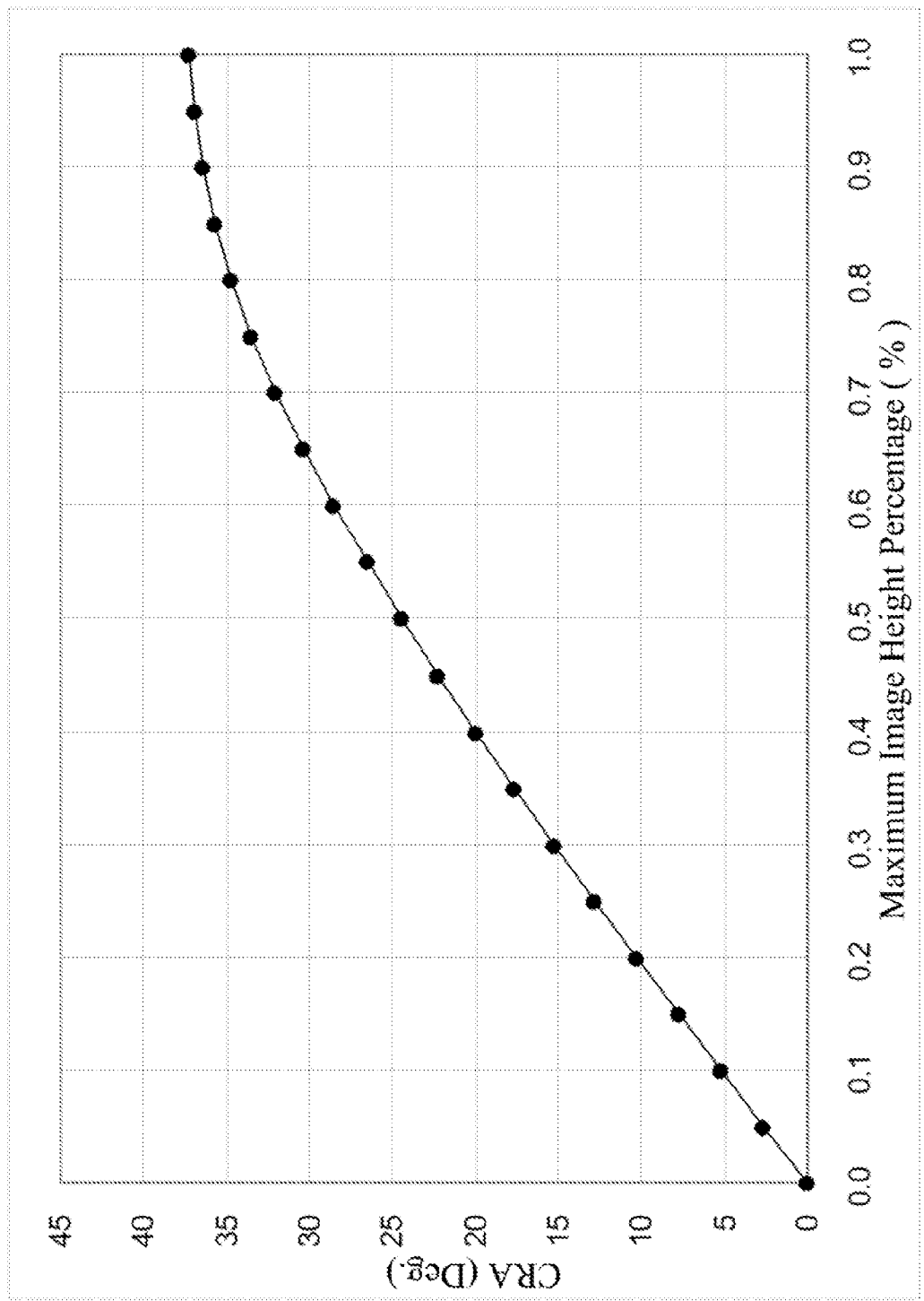
FIG. 23 is a relationship diagram of the CRA (y-axial) and the maximum image height percentage (x-axial) of the image optical lens system according to the 8th embodiment.
Figure 24:
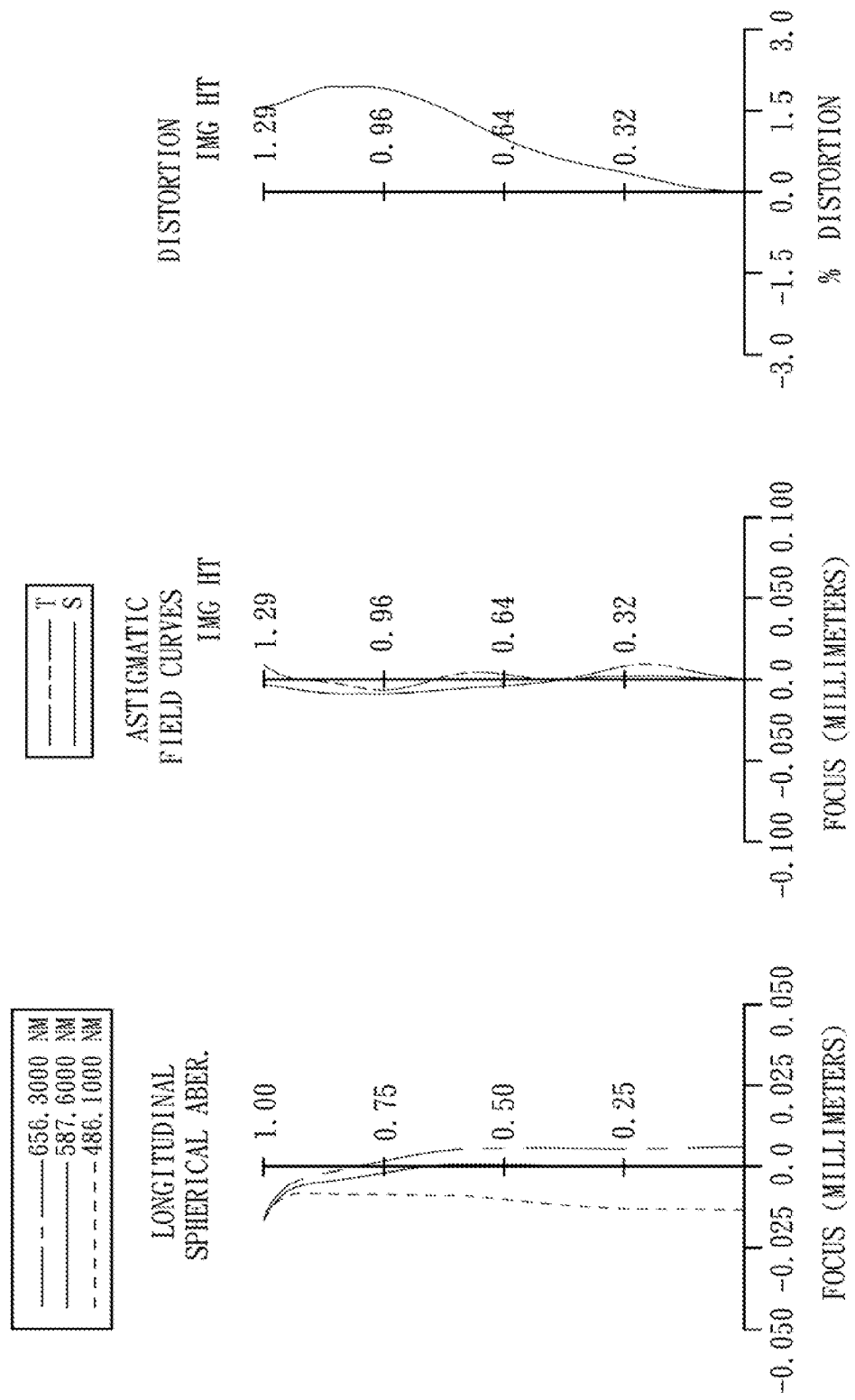
FIG. 24 shows spherical aberration curves, astigmatic field curves and a distortion curve of the image optical lens system according to the 8th embodiment.

FIG. 22 is a schematic view of an image optical lens system according to the 8th embodiment of the present disclosure. FIG. 23 is a relationship diagram of the CRA (y-axial) and the maximum image height percentage (x-axial) of the image optical lens system according to the 8th embodiment. FIG. 24 shows spherical aberration curves, astigmatic field curves and a distortion curve of the image optical lens system according to the 8th embodiment. In FIG. 22, the image optical lens system includes, in order from an object side to an image side, an aperture stop 800, the first lens element 810, the second lens element 820, the third lens element 830, the fourth lens element 840, an IR-filter 860, an image plane 850 and an image sensor 870.

The first lens element 810 with positive refractive power has a convex object-side surface 811 and a concave image-side surface 812, and is made of plastic material. The object-side surface 811 and the image-side surface 812 of the first lens element 810 are aspheric.

The second lens element 820 with negative refractive power has a concave object-side surface 821 and a concave image-side surface 822, and is made of plastic material. The object-side surface 821 and the image-side surface 822 of the second lens element 820 are aspheric.

The third lens element 830 with positive refractive power has a concave object-side surface 831 and a convex image-side surface 832, and is made of plastic material. The object-side surface 831 and the image-side surface 832 of the third lens element 830 are aspheric.

The fourth lens element 840 with negative refractive power has a concave object-side surface 841 and a concave image-side surface 842, and the image-side surface 842 of the fourth lens element 840 changes from concave at the paraxial region to convex at the peripheral region. The fourth lens element 840 is made of plastic material, and the object-side surface 841 and the image-side surface 842 thereof are aspheric.

The IR-filter 860 is made of glass and located between the fourth lens element 840 and the image plane 850, and will not affect the focal length of the image optical lens system.

In the image optical lens system according to the 8th embodiment, the pixel size of the image sensor 870 is 1.75 um, wherein the horizontal direction of the image sensor 870 is 1280 pixels, and the vertical direction of the image to sensor 870 is 720 pixels.

The detailed optical data of the 8th embodiment are shown in Table 22, the aspheric surface data are shown in Table 23, and the maximum image height percentage are shown in Table 24 below.

TABLE 22

8th Embodiment
f = 1.79 mm, Fno = 2.20, HFOV = 35.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.092 | | | | |
| 2 | Lens 1 | 0.770860 (ASP) | 0.375 | Plastic | 1.544 | 55.9 | 1.87 |
| 3 | | 2.636910 (ASP) | 0.121 | | | | |
| 4 | Lens 2 | −57.142900 (ASP) | 0.229 | Plastic | 1.634 | 23.8 | −4.37 |
| 5 | | 2.919410 (ASP) | 0.095 | | | | |
| 6 | Lens 3 | −3.371400 (ASP) | 0.408 | Plastic | 1.544 | 55.9 | 0.87 |
| 7 | | −0.434190 (ASP) | 0.030 | | | | |
| 8 | Lens 4 | −5.177000 (ASP) | 0.308 | Plastic | 1.544 | 55.9 | −0.85 |
| 9 | | 0.517970 (ASP) | 0.300 | | | | |
| 10 | IR-Filter | Plano | 0.150 | Glass | 1.517 | 64.2 | — |
| 11 | | Plano | 0.249 | | | | |
| 12 | Image | Plano | — | | | | |

Note:
Reference wavelength (d-line) is 587.6 nm.

TABLE 23

Aspheric Coefficients

| Surface # | 2 | 3 | 4 | 5 |
|---|---|---|---|---|
| k = | −5.90207E−01 | 9.50844E−01 | 1.00000E+00 | −4.37226E+01 |
| A4 = | 1.29944E−01 | −8.97079E−01 | −1.94216E+00 | −3.62540E−01 |
| A6 = | −9.02020E−01 | −2.40064E+00 | −1.89219E+00 | −1.30995E+00 |
| A8 = | 8.45259E+00 | −1.16892E+01 | −4.45207E+01 | −5.04117E+00 |
| A10 = | −4.07801E+01 | 2.71627E+01 | 3.90039E+02 | 5.54399E+01 |
| A12 = | | | −7.03478E+02 | |

| Surface # | 6 | 7 | 8 | 9 |
|---|---|---|---|---|
| k = | 0.00000E+00 | −3.78741E+00 | −4.63064E+00 | −7.27453E+00 |
| A4 = | 7.95369E−01 | −4.71098E−01 | −7.43753E−01 | −8.63879E−01 |
| A6 = | −1.12124E+00 | 2.66936E+00 | 2.38508E+00 | 2.63994E+00 |
| A8 = | 2.73425E+01 | 1.27815E+01 | −4.84594E+00 | −6.44965E+00 |
| A10 = | −3.44447E+02 | −4.67151E+01 | 6.51141E+00 | 1.02860E+01 |
| A12 = | 1.68048E+03 | −2.06214E+01 | −5.70721E+00 | −1.01112E+01 |
| A14 = | −3.91685E+03 | 2.00188E+01 | 5.79936E+00 | 5.46982E+00 |
| A16 = | 3.60094E+03 | −1.80526E+02 | −4.08736E+00 | −1.22588E+00 |

TABLE 24

| Maximum Image Height Percentage (%) | Image Height (mm) | CRA (Deg.) | Maximum Image Height Percentage (%) | Image Height (mm) | CRA (Deg.) |
|---|---|---|---|---|---|
| 0.00 | 0.000 | 0.0 | 0.55 | 0.707 | 26.5 |
| 0.05 | 0.064 | 2.6 | 0.60 | 0.771 | 28.5 |
| 0.10 | 0.129 | 5.2 | 0.65 | 0.835 | 30.3 |
| 0.15 | 0.193 | 7.8 | 0.70 | 0.900 | 32.0 |
| 0.20 | 0.257 | 10.3 | 0.75 | 0.964 | 33.5 |
| 0.25 | 0.321 | 12.8 | 0.80 | 1.028 | 34.7 |
| 0.30 | 0.386 | 15.3 | 0.85 | 1.092 | 35.7 |
| 0.35 | 0.450 | 17.7 | 0.90 | 1.157 | 36.4 |
| 0.40 | 0.514 | 20.0 | 0.95 | 1.221 | 36.9 |
| 0.45 | 0.578 | 22.3 | 1.00 | 1.285 | 37.2 |
| 0.50 | 0.643 | 24.4 | | | |

In the image optical lens system according to the 8th embodiment, the definitions of f, Fno, HFOV, V1, V2, CT1, CT3, R5, R6, f2, f4, SD, TD, TTL, ImgH, CRA(Max), CRA(H), CRA(D) and CRA(V) are the same as those stated in the 1st embodiment with corresponding values for the 8th embodiment. Moreover, these parameters can be calculated from Tables 22-24 as the following values and satisfy the following relationships:

| f (mm) | 1.79 | SD/TD | 0.94 |
|---|---|---|---|
| Fno | 2.20 | TTL/ImgH | 1.72 |
| HFOV (deg.) | 35.4 | CRA(Max) (deg.) | 37.2 |
| V1−V2 | 32.1 | CRA(H) (deg.) | 36.1 |
| CT3/CT1 | 1.09 | CRA(Max) − CRA(H) (deg.) | 1.1 |
| (R5 + R6)/(R5 − R6) | 1.30 | CRA(D) (deg.) | 37.2 |
| f/f2 | −0.41 | CRA(V) (deg.) | 24.0 |
| f4/f | −0.48 | | |

9th Embodiment

Figure 25:
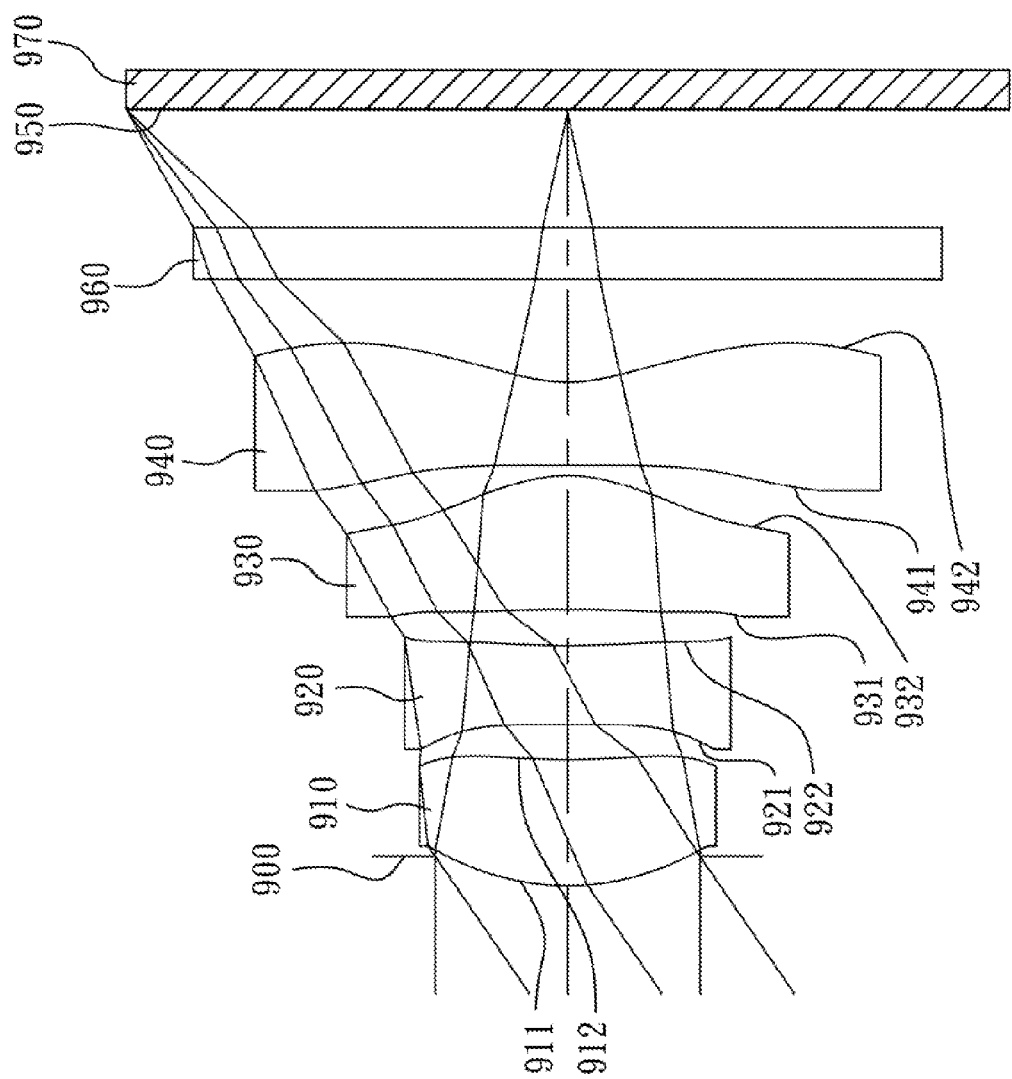
FIG. 25 is a schematic view of an image optical lens system according to the 9th embodiment of the present disclosure.
Figure 26:
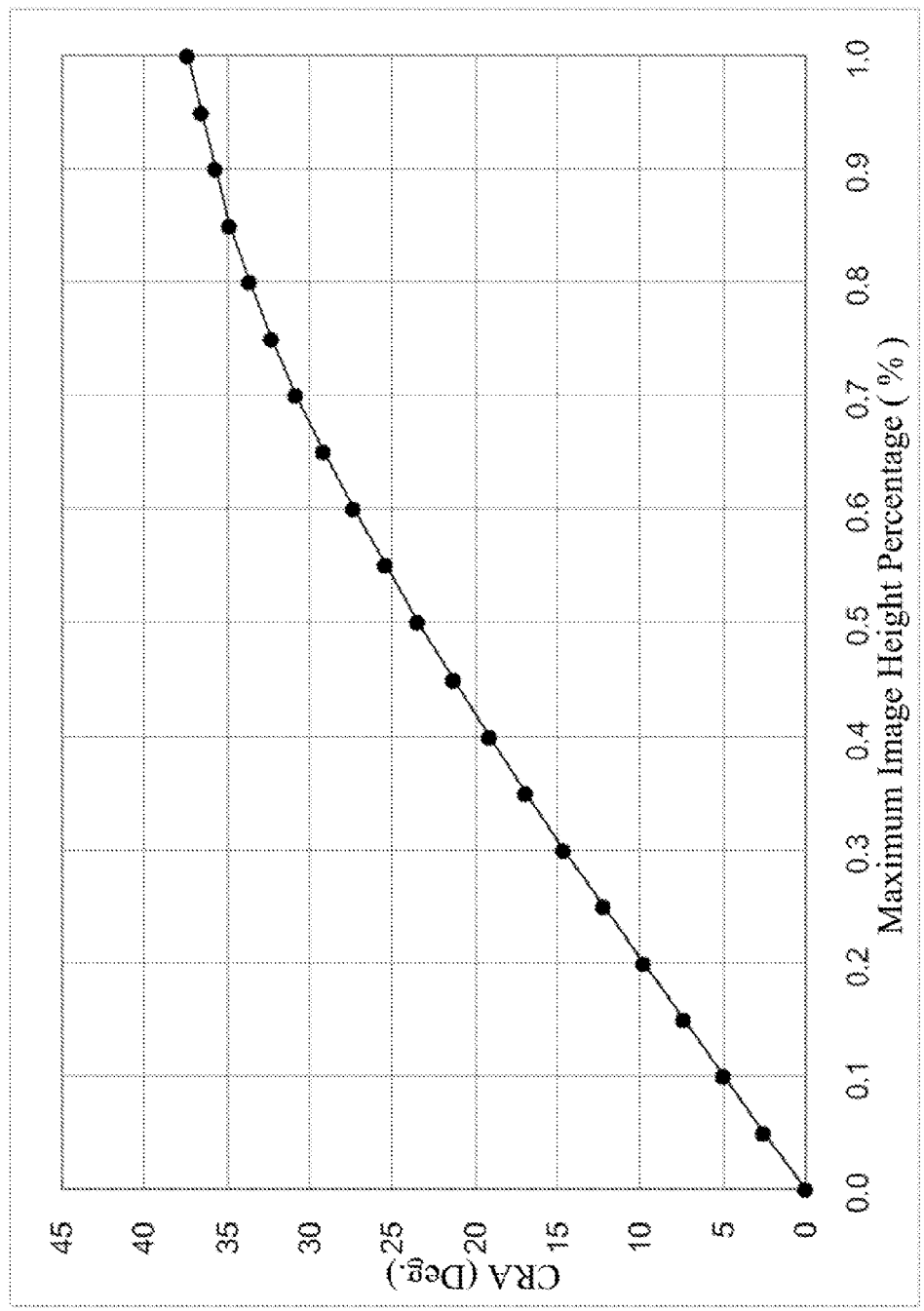
FIG. 26 is a relationship diagram of the CRA (y-axial) and the maximum image height percentage (x-axial) of the image optical lens system according to the 9th embodiment.
Figure 27:
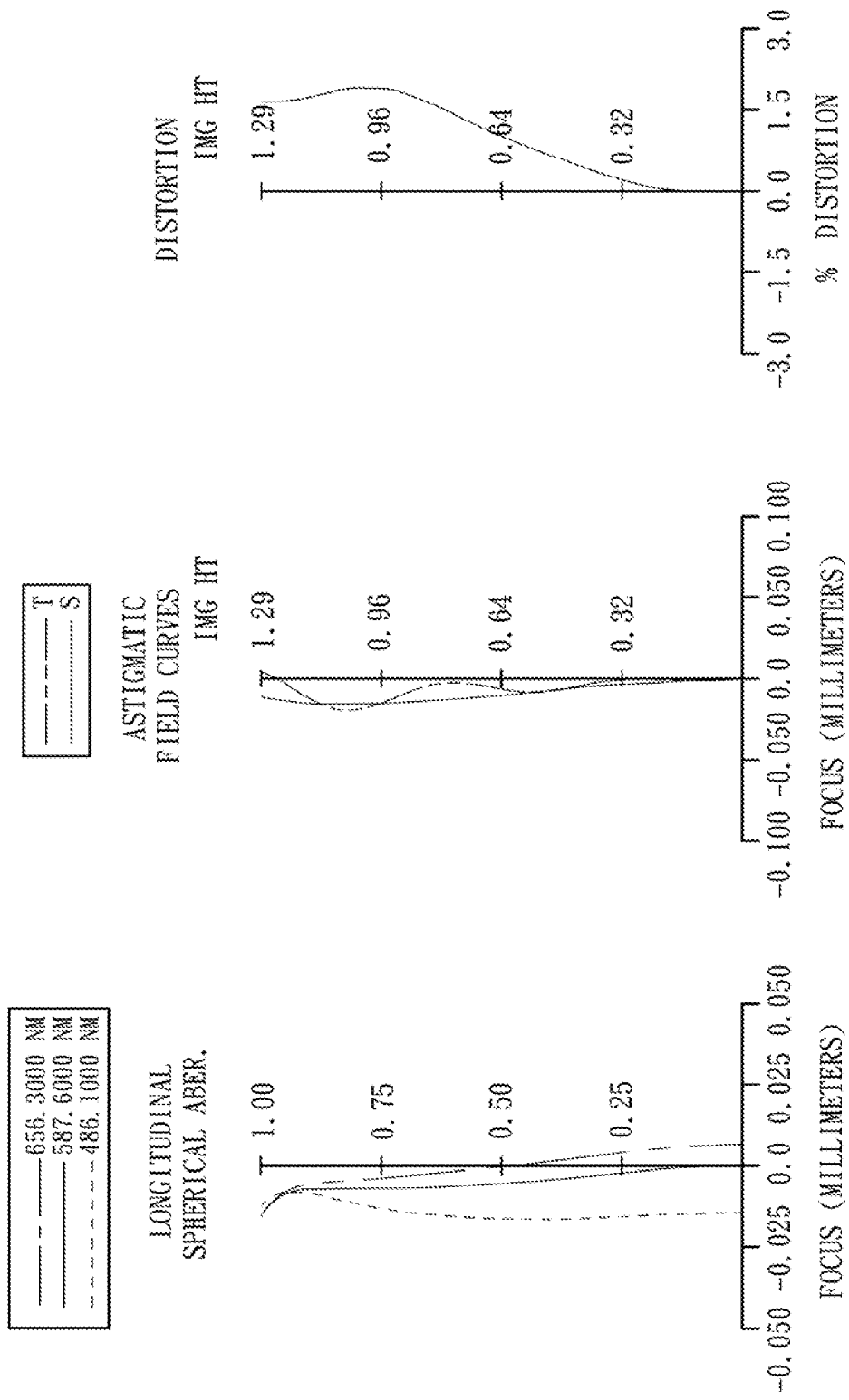
FIG. 27 shows spherical aberration curves, astigmatic field curves and a distortion curve of the image optical lens system according to the 9th embodiment.

FIG. 25 is a schematic view of an image optical lens system according to the 9th embodiment of the present disclosure. FIG. 26 is a relationship diagram of the CRA (y-axial) and the maximum image height percentage (x-axial) of the image optical lens system according to the 9th embodiment. FIG. 27 shows spherical aberration curves, astigmatic field curves and a distortion curve of the image optical lens system according to the 9th embodiment. In FIG. 25, the image optical lens system includes, in order from an object side to an image side, an aperture stop 900, the first lens element 910, the second lens element 920, the third lens element 930, the fourth lens element 940, an IR-filter 960, an image plane 950 and an image sensor 970.

The first lens element 910 with positive refractive power has a convex object-side surface 911 and a concave image-side surface 912, and is made of plastic material. The object-side surface 911 and the mage-side surface 912 of the first lens element 910 are aspheric.

The second lens element 920 with negative refractive power has a convex object-side surface 921 and a concave image-side surface 922, and is made of plastic material. The object-side surface 921 and the image-side surface 922 of the second lens element 920 are aspheric.

The third lens element 930 with positive refractive power has a concave object-side surface 931 and a convex image-side surface 932, and is made of plastic material. The object-side surface 931 and the image-side surface 932 of the third lens element 930 are aspheric.

The fourth lens element 940 with negative refractive power has a convex object-side surface 941 and a concave image-side surface 942, and the image-side surface 942 of the fourth lens element 940 changes from concave at the paraxial region to convex at the peripheral region. The fourth lens element 940 is made of plastic material, and the object-side surface 941 and the image-side surface 942 thereof are aspheric.

The IR-filter 960 is made of glass and located between the fourth lens element 940 and the image plane 950, and will not affect the focal length of the image optical lens system.

In the image optical lens system according to the 9th embodiment, the pixel size of the image sensor 970 is 1.75 um, wherein the horizontal direction of the image sensor 970 is 1280 pixels, and the vertical direction of the image sensor 970 is 720 pixels.

The detailed optical data of the 9th embodiment are shown in Table 25, the aspheric surface data are shown in Table 26, and the maximum image height percentage are shown in Table 27 below.

TABLE 25

9th Embodiment
f = 1.85 mm, Fno = 2.40, HFOV = 34.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.085 | | | | |
| 2 | Lens 1 | 0.745710 (ASP) | 0.367 | Plastic | 1.544 | 55.9 | 1.94 |
| 3 | | 2.097400 (ASP) | 0.102 | | | | |
| 4 | Lens 2 | 28.571400 (ASP) | 0.230 | Plastic | 1.640 | 23.3 | −4.80 |
| 5 | | 2.764590 (ASP) | 0.105 | | | | |
| 6 | Lens 3 | −3.082100 (ASP) | 0.391 | Plastic | 1.544 | 55.9 | 0.88 |
| 7 | | −0.432660 (ASP) | 0.030 | | | | |
| 8 | Lens 4 | 14.814800 (ASP) | 0.241 | Plastic | 1.544 | 55.9 | −0.87 |
| 9 | | 0.456740 (ASP) | 0.300 | | | | |
| 10 | IR-Filter | Plano | 0.150 | Glass | 1.517 | 64.2 | — |
| 11 | | Plano | 0.344 | | | | |
| 12 | Image | Plano | — | | | | |

Note:
Reference wavelength (d-line) is 587.6 nm.

TABLE 26

Aspheric Coefficients

| Surface # | 2 | 3 | 4 | 5 |
|---|---|---|---|---|
| k = | −4.62928E−01 | −1.50562E+00 | −1.00000E+00 | −8.45028E+00 |
| A4 = | 6.96321E−02 | −1.10927E+00 | −2.09065E+00 | −4.80904E−01 |
| A6 = | −3.66977E−01 | −2.97696E+00 | −4.03232E+00 | −3.23076E+00 |
| A8 = | 4.90285E+00 | −1.32052E+01 | −2.70633E+01 | 7.94006E+00 |
| A10 = | −3.30507E+01 | 4.13444E+01 | 4.03291E+02 | 4.67770E+01 |
| A12 = | | | −8.82246E+02 | |

| Surface # | 6 | 7 | 8 | 9 |
|---|---|---|---|---|
| k = | −4.07248E+00 | −4.35399E+00 | −1.00000E+00 | −7.08107E+00 |
| A4 = | 1.33094E+00 | −4.54760E−02 | −1.05472E+00 | −1.02207E+00 |
| A6 = | −5.52155E+00 | 1.84934E+00 | 2.34431E+00 | 2.87904E+00 |
| A8 = | 3.67291E+01 | 1.07390E+01 | −3.91115E+00 | −6.60847E+00 |
| A10 = | −3.39866E+02 | −4.61926E+01 | 6.69501E+00 | 1.01685E+01 |
| A12 = | 1.60354E+03 | −1.17408E+01 | −6.97987E+00 | −9.97783E+00 |
| A14 = | −3.80036E+03 | 2.09763E+02 | 4.18551E+00 | 5.65782E+00 |
| A16 = | 3.50937E+03 | −2.10895E+02 | −1.68989E+00 | −1.37835E+00 |

TABLE 27

| Maximum Image Height Percentage (%) | Image Height (mm) | CRA (Deg.) | Maximum Image Height Percentage (%) | Image Height (mm) | CRA (Deg.) |
|---|---|---|---|---|---|
| 0.00 | 0.000 | 0.0 | 0.55 | 0.707 | 25.5 |
| 0.05 | 0.064 | 2.5 | 0.60 | 0.771 | 27.4 |
| 0.10 | 0.129 | 5.0 | 0.65 | 0.835 | 29.2 |
| 0.15 | 0.193 | 7.4 | 0.70 | 0.900 | 30.8 |
| 0.20 | 0.257 | 9.8 | 0.75 | 0.964 | 32.3 |
| 0.25 | 0.321 | 12.2 | 0.80 | 1.028 | 33.7 |
| 0.30 | 0.386 | 14.6 | 0.85 | 1.092 | 34.8 |
| 0.35 | 0.450 | 16.9 | 0.90 | 1.157 | 35.7 |
| 0.40 | 0.514 | 19.2 | 0.95 | 1.221 | 36.6 |
| 0.45 | 0.578 | 21.3 | 1.00 | 1.285 | 37.3 |
| 0.50 | 0.643 | 23.4 | | | |

In the image optical lens system according to the 9th embodiment, the definitions of f, Fno, HFOV, V1, V2, CT1, CT3, R5, R6, f2, f4, SD, TD, TTL, ImgH, CRA(Max), CRA (H), CRA(D) and CRA(V) are the same as those stated in the 1st embodiment with corresponding values for the 9th embodiment. Moreover, these parameters can be calculated from Tables 25-27 as the following values and satisfy the following relationships:

| f (mm) | 1.85 | SD/TD | 0.94 |
|---|---|---|---|
| Fno | 2.40 | TTL/ImgH | 1.72 |
| HFOV (deg.) | 34.5 | CRA(Max) (deg.) | 37.3 |
| V1-V2 | 32.6 | CRA(H) (deg.) | 35.2 |
| CT3/CT1 | 1.07 | CRA(Max) − CRA(H) (deg.) | 2.1 |

| (R5 + R6)/(R − R6) | 1.33 | CRA(D) (deg.) | 37.3 |
|---|---|---|---|
| f/f2 | −0.39 | CRA(V) (deg.) | 23.0 |
| f4/f | −0.47 | | |

10th Embodiment

Figure 28:
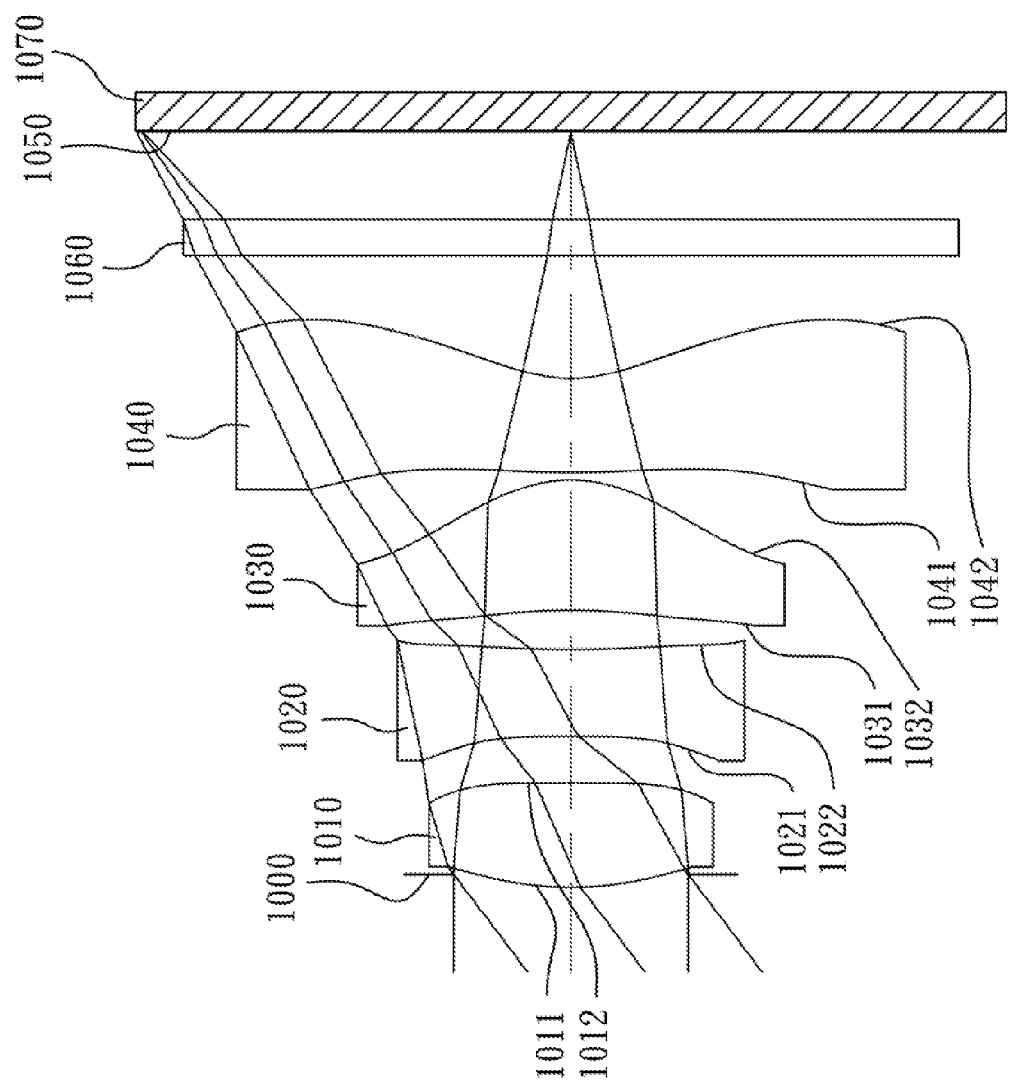
FIG. 28 is a schematic view of an image optical lens system according to the 10th embodiment of the present disclosure.
Figure 29:
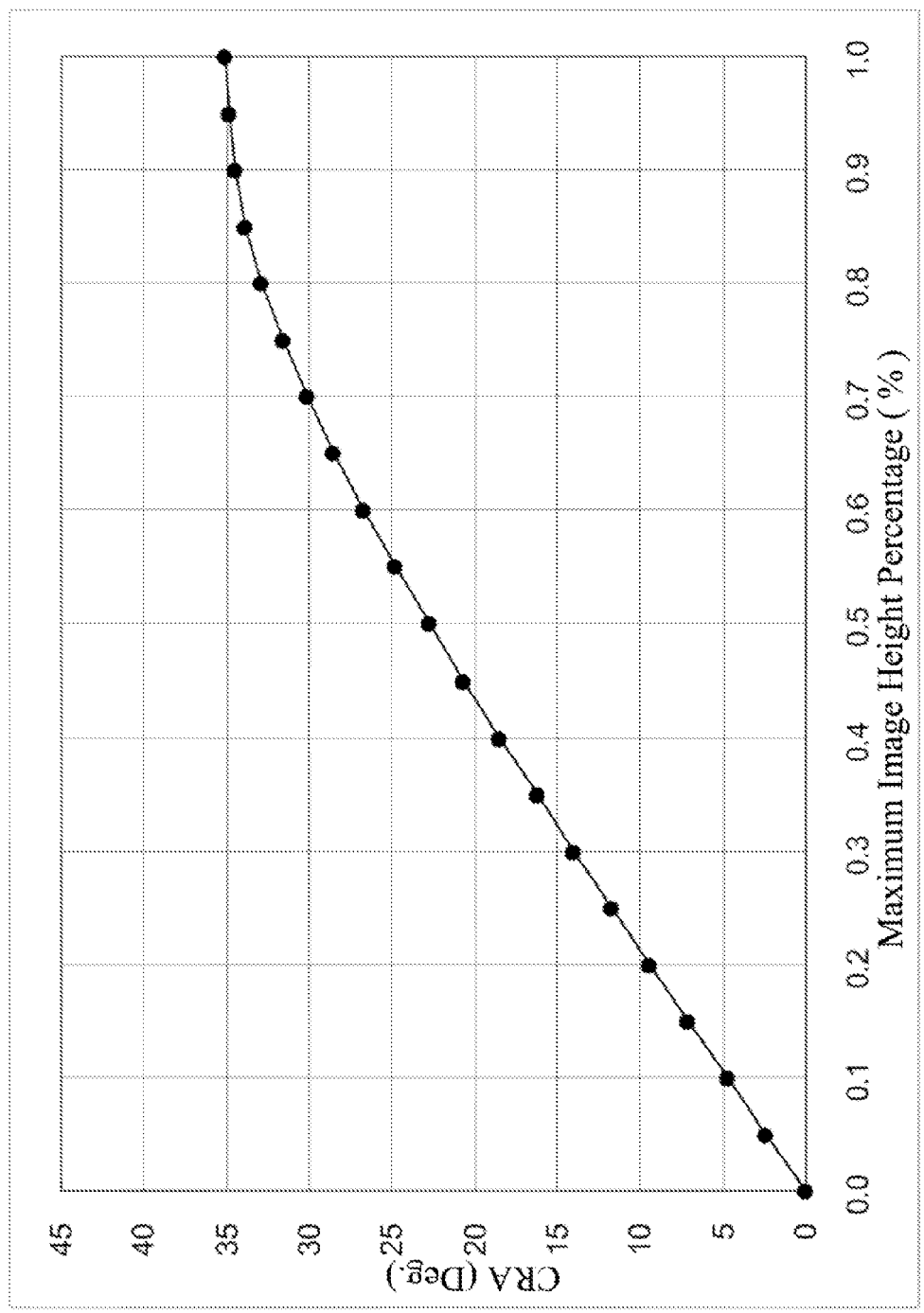
FIG. 29 is a relationship diagram of the CRA (y-axial) and the maximum image height percentage (x-axial) of the image optical lens system according to the 10th embodiment.
Figure 30:
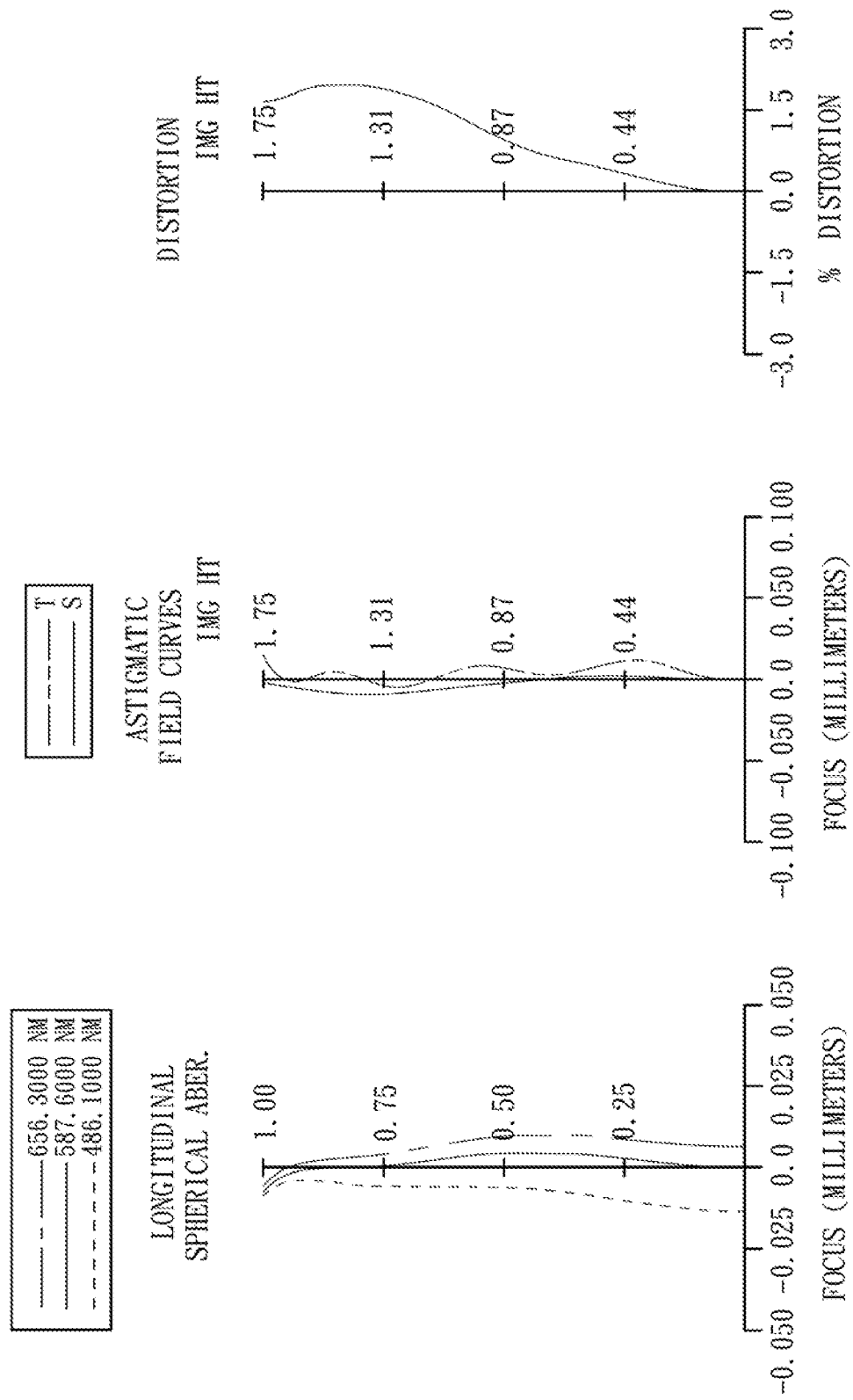
FIG. 30 shows spherical aberration curves, astigmatic field curves and a distortion curve of the image optical lens system according to the 10th embodiment.

FIG. 28 is a schematic view of an image optical lens system according to the 10th embodiment of the present disclosure. FIG. 29 is a relationship diagram of the CRA (y-axial) and the maximum image height percentage (x-axial) of the image optical lens system according to the 10th embodiment. FIG. 30 shows spherical aberration curves, astigmatic field curves and a distortion curve of the image optical lens system according to the 10th embodiment. In FIG. 28, the image optical lens system includes, in order from an object side to an image side, an aperture stop 1000, the first lens element 1010, the second lens element 1020, the third lens element 1030, the fourth lens element 1040, an IR-filter 1060, an image plane 1050 and an image sensor 1070.

The first lens element 1010 with positive refractive power has a convex object-side surface 1011 and a convex image-side surface 1012, and is made of plastic material. The object-side surface 1011 and the image-side surface 1012 of the first lens element 1010 are aspheric.

The second lens element 1020 with negative refractive power has a concave object-side surface 1021 and a concave image-side surface 1022, and is made of plastic material. The object-side surface 1021 and the image-side surface 1022 of the second lens element 1020 are aspheric.

The third lens element 1030 with positive refractive power has a concave object-side surface 1031 and a convex image-side surface 1032, and is made of plastic material. The object-side surface 1031 and the image-side surface 1032 of the third lens element 1030 are aspheric.

The fourth lens element 1040 with negative refractive power has a convex object-side surface 1041 and a concave image-side surface 1042, and the image-side surface 1042 of the fourth lens element 1040 changes from concave at the paraxial region to convex at the peripheral region. The fourth lens element 1040 is made of plastic material, and the object-side surface 1041 and the image-side surface 1042 thereof are aspheric.

The IR-filter 1060 is made of glass and located between the fourth lens element 1040 and the image plane 1050, and will not affect the focal length of the image optical lens system.

In the image optical lens system according to the 10th embodiment, the pixel size of the image sensor 1070 is 1.75 um, wherein the horizontal direction of the image sensor 1070 is 1600 pixels, and the vertical direction of the image sensor 1070 is 1200 pixels.

The detailed optical data of the 10th embodiment are shown in Table 28, the aspheric surface data are shown in Table 29, and the maximum image height percentage are shown in Table 30 below.

TABLE 28

10th Embodiment
f = 2.29 mm, Fno = 2.40, HFOV = 36.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.053 | | | | |
| 2 | Lens 1 | 1.315230 (ASP) | 0.424 | Plastic | 1.544 | 55.9 | 2.34 |
| 3 | | −35.714300 (ASP) | 0.189 | | | | |
| 4 | Lens 2 | −8.064500 (ASP) | 0.353 | Plastic | 1.640 | 23.3 | −4.43 |

TABLE 28-continued

10th Embodiment
f = 2.29 mm, Fno = 2.40, HFOV = 36.9 deg.

| Surface # | | Curvature Radius | Thickness | Material | Index | Abbe # | Focal length |
|---|---|---|---|---|---|---|---|
| 5 | | 4.443100 (ASP) | 0.160 | | | | |
| 6 | Lens 3 | −2.283550 (ASP) | 0.533 | Plastic | 1.535 | 56.3 | 1.15 |
| 7 | | −0.523030 (ASP) | 0.030 | | | | |
| 8 | Lens 4 | 3.773800 (ASP) | 0.380 | Plastic | 1.535 | 56.3 | −1.22 |
| 9 | | 0.535790 (ASP) | 0.500 | | | | |
| 10 | IR-Filter | Plano | 0.150 | Glass | 1.517 | 64.2 | — |
| 11 | | Plano | 0.358 | | | | |
| 12 | Image | Plano | — | | | | |

Note:
Reference wavelength (d-line) is 587.6 nm.

TABLE 29

Aspheric Coefficients

| Surface # | 2 | 3 | 4 | 5 |
|---|---|---|---|---|
| k = | −1.77933E+00 | 1.00000E+00 | −2.00000E+01 | 1.00000E+00 |
| A4= | −3.07601E−02 | −5.25746E−01 | −7.67155E−01 | −1.97613E−01 |
| A6 = | −2.40251E−01 | −7.56583E−01 | 2.78844E−02 | 2.08185E−01 |
| A8 = | −3.98509E−01 | 7.31066E−01 | −4.71066E+00 | −9.69476E−01 |
| A10 = | −2.80753E+00 | −6.09348E−01 | 2.80583E+01 | 2.05625E+00 |
| A12 = | | | −3.14936E+01 | |

| Surface # | 6 | 7 | 8 | 9 |
|---|---|---|---|---|
| k = | −1.85524E+00 | −3.24063E+00 | −2.00000E+01 | −5.24407E+00 |
| A4 = | 2.50881E−01 | −2.34756E−01 | −3.78338E−01 | −3.61337E−01 |
| A6 = | 7.97272E−02 | 1.68561E−01 | 5.30853E−01 | 6.11547E−01 |
| A8 = | 3.11408E+00 | 1.85265E+00 | −6.10509E−01 | −7.99002E−01 |
| A10 = | −2.21498E+01 | −2.72228E+00 | 4.12563E−01 | 6.69024E−01 |
| A12 = | 5.68342E+01 | −7.03691E−01 | −1.86642E−01 | −3.42737E−01 |
| A14 = | −7.10715E+01 | 3.52079E+00 | 1.12849E−01 | 9.68654E−02 |
| A16 = | 3.64912E+01 | −1.79025E+00 | −4.14538E−02 | −1.14766E−02 |

TABLE 30

| Maximum Image Height Percentage (%) | Image Height (mm) | CRA (Deg.) | Maximum Image Height Percentage (%) | Image Height (mm) | CRA (Deg.) |
|---|---|---|---|---|---|
| 0.00 | 0.000 | 0.0 | 0.55 | 0.963 | 24.8 |
| 0.05 | 0.088 | 2.4 | 0.60 | 1.050 | 26.7 |
| 0.10 | 0.175 | 4.7 | 0.65 | 1.138 | 28.5 |
| 0.15 | 0.263 | 7.1 | 0.70 | 1.225 | 30.2 |
| 0.20 | 0.350 | 9.4 | 0.75 | 1.313 | 31.6 |
| 0.25 | 0.438 | 11.7 | 0.80 | 1.400 | 32.9 |
| 0.30 | 0.525 | 14.0 | 0.85 | 1.488 | 33.8 |
| 0.35 | 0.613 | 16.3 | 0.90 | 1.575 | 34.5 |
| 0.40 | 0.700 | 18.5 | 0.95 | 1.663 | 34.9 |
| 0.45 | 07.88 | 20.6 | 1.00 | 1.750 | 35.1 |
| 0.50 | 0.875 | 22.7 | | | |

In the image optical lens system according to the 10th embodiment, the definitions of f, Fno, HFOV, V1, V2, CT1, CT3, R5, R6, f2, f4, SD, TD, TTL, ImgH, CRA(Max), CRA(H), CRA(D) and CRA(V) are the same as those stated in the 1st embodiment with corresponding values for the 10th embodiment. Moreover, these parameters can be calculated from Tables 28-30 as the following values and satisfy the following relationships:

| f (mm) | 2.29 | SD/TD | 0.97 |
|---|---|---|---|
| Fno | 2.40 | TTL/ImgH | 1.73 |
| HFOV (deg.) | 36.9 | CRA(Max) (deg.) | 35.1 |
| V1-V2 | 32.6 | CRA(H) (deg.) | 32.9 |
| CT3/CT1 | 1.26 | CRA(Max) − CRA(H) (deg.) | 2.2 |
| (R5 + R6)/(R5 − R6) | 1.59 | CRA(D) (deg.) | 35.1 |
| f/f2 | −0.52 | CRA(V) (deg.) | 26.7 |
| f4/f | −0.53 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image optical lens system comprising, in order from an object side to an image side:
    a first lens element with positive refractive power having a convex object-side surface;
    second lens element with negative refractive power;
    a third lens element with positive refractive power made of plastic material and having a convex image-side surface, wherein an object-side surface and the image-side surface of the third lens element are aspheric; and
    a fourth lens element with negative refractive power made of plastic material, and having a concave object-side surface and a concave image-side surface, wherein the object-side surface and the image-side surface of the fourth lens element are aspheric, and the image-side surface of the fourth lens element changes from concave at the paraxial region to convex at the peripheral region;
    wherein a maximum chief ray angle of the mage optical lens system is CRA(Max), a curvature radius of the object-side surface of the third lens element is R5, a curvature radius of the image-side surface of the third lens element is R6, a central thickness of the first lens element is CT1, and a central thickness of the third lens element is CT3, the following relationships are satisfied:

33.5 degrees<CRA(Max)<45.0 degrees;

0.7<(R5+R6)/(R5−R6)<3.5; and 1.2<CT3/CT1<3.0.

2. The image optical lens system of claim 1, wherein the curvature radius of the object-side surface of the third lens element is R5, and the curvature radius of the image-side surface of the third lens element is R6, the following relationship is satisfied:

$1.0<(R5+R6)/(R5-R6)<3.5.$

3. The image optical lens system of claim 2, wherein a focal length of the image optical lens system is f, and a focal length of the fourth lens element is f4, the following relationship is satisfied:

$-0.8<f4/f<-0.3.$

4. The image optical lens system of claim 3, further comprising:
an image sensor located on an image plane, wherein when an image height of the image optical lens system is a half of the horizontal length of the photosensitive area of the image sensor, the chief ray angle of the image optical lens system is CRA(H), and the following relationship is satisfied:

$32.0$ degrees$<CRA(H)<45.0$ degrees.

5. The image optical lens system of claim 3, wherein an Abbe number of the first lens element is V1 and an Abbe number of the second lens element is V2, the following relationship is satisfied:

$30<V1-V2<50.$

6. The image optical lens system of claim 3, wherein the second lens element has a concave object-side surface and a concave image-side surface.

7. The image optical lens system of claim 3, further comprising:
a stop, wherein an axial distance between the stop and the image-side surface of the fourth lens element is SD, and an axial distance between the object-side surface of the first lens element and the image-side surface of the fourth lens element is TD, the following relationship is satisfied:

$0.70<SD/TD<0.90.$

8. The image optical lens system of claim 3, wherein a maximum image height of the image optical lens system is ImgH, and an axial distance between the object-side surface of the first lens element and an image plane is TTL, the following relationship is satisfied:

$TTL/ImgH<1.60.$

9. The image optical lens system of claim 3, wherein the maximum chief ray angle of the image optical lens system is CRA(Max), and the following relationship is satisfied:

$34.2$ degrees$<CRA(Max)<45.0$ degrees.

10. The image optical lens system of claim 3, wherein the focal length of the image optical lens system is f, and the focal length of the fourth lens element is f4, the following relationship is satisfied:

$-0.65<f4/f<-0.3.$

11. An image optical lens system comprising, in order from an object side to an image side:
a first lens element with positive refractive power having a convex object-side surface;
a second lens element with negative refractive power having a concave object-side surface;
a third lens element with positive refractive power made of plastic material and having a convex image-side surface, wherein an object-side surface and the image-side surface of the third lens element are aspheric; and
a fourth lens element with negative refractive power made of plastic material and having a concave image-side surface, wherein an object-side surface and the image-side surface of the fourth lens element are aspheric, and the image-side surface of the fourth lens element changes from concave at the paraxial region to convex at the peripheral region;
wherein the image optical lens system further comprises stop located between the first lens element and the second lens element, an axial distance between the stop and the image-side surface of the fourth lens element is SD, an axial distance between the object-side surface of the first lens element and the image-side surface of the fourth lens element is TD, and a maximum chief ray angle of the image optical lens system is CRA(Max), the following relationships are satisfied:

$33.5$ degrees$<CRA(Max)<45.0$ degrees; and $0.70<SD/TD<0.90.$

12. The image optical lens system of claim 11, wherein the second lens element has a concave image-side surface.

13. The image optical lens system of claim 12, wherein a focal length of the image optical lens system is f, and a focal length of the fourth lens element is f4, the following relationship is satisfied:

$-0.8<f4/f<-0.3.$

14. The image optical lens system of claim 13, wherein the focal length of the image optical lens system is f, and a focal length of the second lens element is f2, the following relationship is satisfied:

$-0.9<f/2<-0.3.$

15. The image optical lens system of claim 14, wherein a curvature radius of the object-side surface of the third lens element is R5, and a curvature radius of the image-side surface of the third lens element is R6, the following relationship is satisfied:

$1.0<(R5+R6)/(R5-R6)<3.5.$

16. The image optical lens system of claim 13, wherein an Abbe number of the first lens element is V1, and an Abbe number of the second lens element is V2, the following relationship is satisfied:

$30<V1-V2<50.$

17. The image optical lens system of claim 13, wherein the fourth lens element has a concave object-side surface.

18. The image optical lens system of claim 13, further comprising:
an image sensor located on an image plane, wherein when an image height of the image optical lens system is a half of the horizontal length of the photosensitive area of the image sensor, the chief ray angle of the image optical lens system is CRA(H), and the maximum chief ray angle of the image optical lens system is CRA(Max), the following relationship is satisfied:

$CRA(Max)-CRA(H)<3.5$ degrees.

19. An image optical lens system comprising, in order from an object side to an image side:
a first lens element with positive refractive power having a convex object-side surface;
a second lens element with negative refractive power having a concave object-side surface;
a third lens element with positive refractive power made of plastic material, and having a concave object-side surface and a convex image-side surface, wherein the object-side surface and the image-side surface of the third lens element are aspheric; and a fourth lens element with negative refractive power made of plastic material and having a concave image-side surface, wherein an object-side surface and the image-side surface of the fourth lens element are aspheric, and the image-side surface of the fourth lens element changes from concave at the paraxial region to convex at the peripheral region;

wherein a maximum chief ray angle of the image optical lens system is CRA(Max), and the following relationship is satisfied:

33.5 degrees<CRA(Max)<45.0 degrees.

20. The image optical lens system of claim 19, further comprising:

an image sensor located on an image plane, wherein when an image height of the image optical lens system is a half of the horizontal length of the photosensitive area of the image sensor, the chief ray angle of the image optical lens system is CRA(H), the following relationship is satisfied:

32.0 degrees<CRA(H)<45.0 degrees.

21. The image optical lens system of claim 20, wherein the second lens element has a concave image-side surface.

22. The image optical lens system of claim 21, wherein the fourth lens element has a concave object-side surface.

23. The image optical lens system of claim 22, wherein when the image height of the image optical lens system is a half of the horizontal length of the photosensitive area of the image sensor, the chief ray angle of the image optical lens system is CRA(H), and the maximum chief ray angle of the image optical lens system is CRA(Max), the following relationship is satisfied:

CRA(Max)−CRA(H)<3.5 degrees.

24. The image optical lens system of claim 22, further comprising:

a stop, wherein an axial distance between the stop and the image-side surface of the fourth lens element is SD, and an axial distance between the object-side surface of the first lens element and the image-side surface of the fourth lens element is TD, the following relationship is satisfied:

0.70<SD/TD<0.90.

25. The image optical lens system of claim 24, wherein a maximum image height of the image optical lens system is ImgH and an axial distance between the object-side surface of the first lens element and an image plane is TTL, the following relationship is satisfied:

TTL/ImgH<1.60.

* * * * *

UNITED STATES PATENT AND TRADEMARK OFFICE
CERTIFICATE OF CORRECTION

PATENT NO. : 8,878,975 B2
APPLICATION NO. : 13/594867
DATED : November 4, 2014
INVENTOR(S) : Hsiang-Chi Tang, Tsung-Han Tsai and Ming-Ta Chou It is certified that error appears in the above-identified patent and that said Letters Patent is hereby corrected as shown below:

In the Claims,
(1) In column 32, line 40, Claim 1 of the issued patent reads as "second lens element with negative refractive power;", but it should read as "a second lens element with negative refractive power;".

(2) In column 32, lines 52-53, Claim 1 of the issued patent read as "a maximum chief ray angle of the mage optical lens system is CRA(Max)", but it should read as "a maximum chief ray angle of the image optical lens system is CRA(Max)".

(3) In column 34, lines 8-9, Claim 11 of the issued patent read as "the image optical lens system further comprises stop", but it should read as "the image optical lens system further comprises a stop".

Signed and Sealed this
Twenty-seventh Day of October, 2015

Michelle K. Lee
*Director of the United States Patent and Trademark Office*